US012259252B2

(12) United States Patent
Strawn et al.

(10) Patent No.: US 12,259,252 B2
(45) Date of Patent: Mar. 25, 2025

(54) GROUPING MANEUVERS FOR DISPLAY IN A NAVIGATION PRESENTATION

(71) Applicant: Apple Inc., Cupertino, CA (US)

(72) Inventors: Justin M. Strawn, Palo Alto, CA (US); Adam B. Findley, East Palo Alto, CA (US); Nathan L. Fillhardt, Scott Valley, CA (US); Brian J. Andrich, San Fracisco, CA (US); Usama M. Hajj, San Fracisco, CA (US); Tadayasu Sasada, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/960,339

(22) Filed: Oct. 5, 2022

(65) Prior Publication Data
US 2023/0025576 A1    Jan. 26, 2023

Related U.S. Application Data

(63) Continuation of application No. 16/917,453, filed on Jun. 30, 2020, now Pat. No. 11,486,724, which is a
(Continued)

(51) Int. Cl.
*G01C 21/36*    (2006.01)
*G01C 21/34*    (2006.01)
(Continued)

(52) U.S. Cl.
CPC ..... *G01C 21/3635* (2013.01); *G01C 21/3415* (2013.01); *G01C 21/3608* (2013.01);
(Continued)

(58) Field of Classification Search
None
See application file for complete search history.

(56) References Cited

U.S. PATENT DOCUMENTS

| 4,477,802 A | 10/1984 | Walter et al. |
| 4,914,605 A | 4/1990 | Loughmiller et al. |

(Continued)

*Primary Examiner* — Gelek W Topgyal
(74) *Attorney, Agent, or Firm* — Invoke

(57) ABSTRACT

Some embodiments of the invention provide several novel methods for generating a navigation presentation that displays a device navigating a route on a map. The method of some embodiments uses a virtual camera that, based on detected changes in the navigation context, dynamically modifies the way it captures portions of the map to produce different navigation scenes in the navigation presentation. To generate the navigation scenes, the method of some embodiments (1) identifies different sets of attributes that describe the different navigation contexts at different times during the navigation presentation, and (2) uses these different sets of attributes to identify different styles for operating the virtual camera. In some embodiments, the method uses an identified style to specify the virtual camera's positional attributes, which, in turn, define the portions of the map that the virtual camera identifies for rendering to produce several navigation scenes for a period of time (e.g., until the navigation context changes, or until the navigation presentation ends when the navigation context does not change again). During the navigation presentation, each time the navigation context changes, the identified set of attributes may change. This change, in turn, may cause the method of some embodiments to select a new style for operating the virtual camera. When the style for operating the virtual camera changes, the method of some embodiments modifies the way the virtual camera captures the portion of the map to render.

21 Claims, 20 Drawing Sheets

Related U.S. Application Data continuation of application No. 15/274,260, filed on Sep. 23, 2016, now Pat. No. 10,739,157.

(60) Provisional application No. 62/348,959, filed on Jun. 12, 2016.

(51) Int. Cl.

| | | |
|---|---|---|
| *G06F 3/14* | (2006.01) | |
| *G06F 3/147* | (2006.01) | |
| *G06T 15/20* | (2011.01) | |
| *G06T 17/05* | (2011.01) | |
| *G06T 19/00* | (2011.01) | |
| *G08G 1/0968* | (2006.01) | |
| *G08G 1/0969* | (2006.01) | |
| *H04N 7/18* | (2006.01) | |
| *G10L 15/22* | (2006.01) | |

(52) U.S. Cl.
CPC ..... *G01C 21/3638* (2013.01); *G01C 21/3655* (2013.01); *G01C 21/3667* (2013.01); *G01C 21/3676* (2013.01); *G06F 3/14* (2013.01); *G06F 3/147* (2013.01); *G06T 15/20* (2013.01); *G06T 17/05* (2013.01); *G06T 19/003* (2013.01); *G08G 1/096827* (2013.01); *G08G 1/0969* (2013.01); *H04N 7/183* (2013.01); *H04N 7/188* (2013.01); *G09G 2380/10* (2013.01); *G10L 15/22* (2013.01); *G10L 2015/223* (2013.01)

(56) References Cited

U.S. PATENT DOCUMENTS

| | | | | |
|---|---|---|---|---|
| 5,452,212 | A * | 9/1995 | Yokoyama | G01C 21/3629 |
| | | | | 701/428 |
| 5,608,635 | A | 3/1997 | Tamai | |
| 6,169,552 | B1 | 1/2001 | Endo et al. | |
| 6,363,322 | B1 * | 3/2002 | Millington | G01C 21/3629 |
| | | | | 701/428 |
| 6,397,145 | B1 * | 5/2002 | Millington | G08G 1/096827 |
| | | | | 701/533 |
| 6,529,822 | B1 * | 3/2003 | Millington | G01C 21/3632 |
| | | | | 701/457 |
| 7,321,824 | B1 | 1/2008 | Nesbitt | |
| 7,818,116 | B1 | 10/2010 | Nesbitt | |
| 8,350,849 | B1 | 1/2013 | Jones et al. | |
| 8,417,448 | B1 * | 4/2013 | Denise | G01C 21/3484 |
| | | | | 701/410 |
| 8,428,873 | B2 | 4/2013 | Chau et al. | |
| 8,442,764 | B2 | 5/2013 | Schulze et al. | |
| 8,626,434 | B1 | 1/2014 | Kornmann et al. | |
| 8,847,992 | B2 | 9/2014 | Kornmann et al. | |
| 8,880,336 | B2 | 11/2014 | Van et al. | |
| 9,250,093 | B2 | 2/2016 | Ivanov et al. | |
| 9,269,178 | B2 | 2/2016 | Piemonte et al. | |
| 9,459,115 | B1 | 10/2016 | Elliott et al. | |
| 2002/0109701 | A1 | 8/2002 | Deering | |
| 2003/0071808 | A1 | 4/2003 | Matsumoto et al. | |
| 2004/0012505 | A1 | 1/2004 | Yokota | |
| 2006/0074553 | A1 | 4/2006 | Foo et al. | |
| 2006/0215020 | A1 | 9/2006 | Mori et al. | |
| 2007/0192739 | A1 | 8/2007 | Hunleth et al. | |
| 2007/0276596 | A1 | 11/2007 | Solomon et al. | |
| 2010/0325589 | A1 | 12/2010 | Ofek et al. | |
| 2011/0015860 | A1 | 1/2011 | Nesbitt | |
| 2011/0022295 | A1 | 1/2011 | Lee | |
| 2011/0022301 | A1 | 1/2011 | Lee | |
| 2012/0173606 | A1 | 7/2012 | Becker | |
| 2012/0197696 | A1 | 8/2012 | Beyeler et al. | |
| 2012/0303264 | A1 | 11/2012 | Su et al. | |
| 2013/0035853 | A1 | 2/2013 | Stout et al. | |
| 2013/0103313 | A1 * | 4/2013 | Moore | G01C 21/3415 |
| | | | | 701/533 |
| 2013/0162665 | A1 | 6/2013 | Lynch | |
| 2013/0297599 | A1 | 11/2013 | Henshall | |
| 2013/0321400 | A1 | 12/2013 | Van et al. | |
| 2013/0321401 | A1 | 12/2013 | Piemonte et al. | |
| 2013/0322702 | A1 | 12/2013 | Piemonte et al. | |
| 2013/0325322 | A1 | 12/2013 | Blumenberg | |
| 2013/0332057 | A1 | 12/2013 | Moore et al. | |
| 2014/0005925 | A1 | 1/2014 | Pierfelice | |
| 2014/0019036 | A1 | 1/2014 | Lemay et al. | |
| 2014/0279790 | A1 | 9/2014 | Ramachandran et al. | |
| 2014/0307949 | A1 | 10/2014 | Eyring et al. | |
| 2014/0365113 | A1 | 12/2014 | McGavran et al. | |
| 2014/0365114 | A1 | 12/2014 | Van et al. | |
| 2014/0365122 | A1 | 12/2014 | McGavran et al. | |
| 2014/0372023 | A1 | 12/2014 | Hayot | |
| 2015/0073642 | A1 | 3/2015 | Widmer et al. | |
| 2016/0102992 | A1 | 4/2016 | Otero et al. | |
| 2016/0231134 | A1 * | 8/2016 | Nguyen Kim | G01C 21/3664 |
| 2017/0039765 | A1 | 2/2017 | Zhou et al. | |
| 2017/0314945 | A1 * | 11/2017 | König | G01C 21/3461 |
| 2020/0211387 | A1 | 7/2020 | Noy et al. | |

\* cited by examiner

All maneuvers that satisfy at least one group criterion are within 2nd threshold distance All maneuvers that satisfy at least one group criterion are within 2nd threshold distance, except M2 and M3 which are farther than 2nd threshold distance

GROUPING MANEUVERS FOR DISPLAY IN A NAVIGATION PRESENTATION

INCORPORATION BY REFERENCE; DISCLAIMER

Each of the following applications are hereby incorporated by reference: application Ser. No. 16/917,453 filed on Jun. 30, 2020; application Ser. No. 15/274,260 filed on Sep. 23, 2016; application No. 62/348,959 filed on Jun. 12, 2016. The Applicant hereby rescinds any disclaimer of claim scope in the parent application(s) or the prosecution history thereof and advises the USPTO that the claims in this application may be broader than any claim in the parent application(s).

BACKGROUND

Today, more than ever, people rely on turn-by-turn navigation presentations to navigate routes to their desired destinations. Many vehicle information systems provide such navigation presentations as one of their features. Also, most mobile devices (e.g., smartphones, tablets, etc.) execute navigation applications that provide such presentations. Unfortunately, the designs of typical navigation presentations have not evolved much in recent years. They often provide static navigation presentations that do not adjust to changes in the navigated routes.

SUMMARY

Some embodiments of the invention provide several novel methods for generating a navigation presentation that displays a device navigating a route on a map. The method of some embodiments uses a virtual camera that, based on detected changes in the navigation context, dynamically modifies the way it captures portions of the map to produce different navigation scenes in the navigation presentation. In some embodiments, a virtual camera is a conceptual representation of the field of view that is defined to emanate from a particular location and orientation in the 3D map coordinate system.

To generate the navigation scenes, the method identifies different sets of attributes that describe the navigation context at different times during the navigation. Examples of such attributes include the type of road currently being navigated, the posted speed limit for the current road, the distance to the next maneuver in the route, the type of next maneuver (e.g., whether the maneuver is a grouped maneuver, a roundabout, an exit ramp, close to other upcoming maneuvers, etc.), the number of nearby maneuvers after the next maneuver, the navigation status (e.g., on-route, off-route, recalculating-route), etc.

After identifying the set of attributes that describe a new navigation context, the method uses this set of attributes to identify a style for operating the virtual camera. In some embodiments, a data structure on the device stores several styles based on their associated set of attributes. In these embodiments, the method identifies a style for a new attribute set by comparing this attribute set with the set of attributes of the stored styles in order to find a style with a matching attribute set.

The method then provides the identified style to a virtual camera (VC) engine, which uses this style to identify positional attributes of the virtual camera. These positional attributes, in turn, define the portions of the map that the virtual camera identifies for rendering to produce several navigation scenes for a period of time (e.g., until the navigation context changes, or until the navigation presentation ends when the navigation context does not change again). As mentioned above, the method of some embodiments repeatedly identifies different sets of attributes to describe different navigation contexts at different times in the navigation presentation. Each time the navigation context changes, the identified set of attributes may change, and this change may cause the method of some embodiments to select a new style for operating the virtual camera. When the style for operating the virtual camera changes, the VC engine modifies the way the virtual camera captures the portion of the map to render.

In the stored set of styles, each style in some embodiments has a set of properties from which the VC engine can identify the virtual camera's angular pitch (e.g., from a top-down position to a perspective angular position), the virtual camera's rotation (e.g., in an X-Y plane defined by x- and y-axes of the map's coordinate system), and the virtual camera's distance from a region on the map that it targets (e.g., from a device-representing puck that travels along the map). In some embodiments, the virtual camera has a system of springs that specify its angular pitch, rotation, and height, and a style's associated set of properties are used to define one or more parameters of the spring system. The spring system in some embodiments also includes a spring for the position of the puck on the screen that displays the navigation presentation (i.e., the display screen on which the virtual camera captured view is projected). These embodiments use the spring system because this system provides an implicit way to specify the virtual camera's movement at different instances in time and thereby provide an easy way to specify a natural animation of the navigated scenes.

In some embodiments, the VC engine generates a set of framing parameters from the identified style's set of properties and uses the framing parameters to identify positional attributes of the virtual camera for a period of time. In some of these embodiments, the VC engine operates the virtual camera either in a tracking mode or a framing mode. During the tracking mode, the virtual camera tracks the puck along the route and maintains the device-representing puck (referred to below as the "puck") at desired location(s) on the display screen that displays the navigation presentation. In the framing mode, the virtual camera defines frames to capture collection of points along the route (including the puck's location) and displays these frames at desired region(s) of interest on the display screen as the puck travels along the route.

To generate the navigation presentation, the method of some embodiments uses the following four coordinate systems: (1) a map coordinate system, (2) a puck coordinate system, (3) a virtual camera coordinate system, and (4) a display screen coordinate system. In some of these embodiments, the first three coordinate systems are three dimensional systems, with x-, y-, and z-axes, while the fourth coordinate system is a two dimensional system with x- and y-axes.

During tracking mode, the VC engine in some embodiments maintains the same angular orientation (e.g., a zero angular offset) between the virtual camera's coordinate system and the puck's coordinate system in the x-y plane of the map's coordinate system. For instance, in some embodiments, the virtual camera points in the same direction as the puck during the tracking mode in some embodiments. Also, during the tracking mode, the VC engine in some embodiments maintains the positional relationship (e.g., a zero offset) between the origins of the VC's coordinate system and the puck's coordinate systems. In other embodiments, the VC engine during the tracking mode allows the angular orientation and/or positional relationship to change between the VC and the puck coordinate systems for a transient period of time (e.g., the time during which the puck makes a left or right turn) to show more context around a maneuver.

During framing mode, the VC engine in some embodiments completely or partially disassociates the angular rotation of the virtual camera's coordinate system and the puck's coordinate system. This allows the puck to rotate independently of the map during the framing mode for several navigation scenes, and allows the virtual camera to capture more of the desired region of interest during this mode. During framing mode, the VC engine in some embodiments no longer requires the origin of the VC's coordinate system to be held at a particular offset with respect to the origin of the puck's coordinate system. This allows the virtual camera to assume a variety of offset positions to capture more of the useful map areas around or ahead of the puck.

In some embodiments, the VC engine disassociates the positional and angular relationships of the virtual camera and the puck during the framing mode by having the virtual camera frame a collection of points, including the puck, for display at a desired region of interest on the display screen. This region of interest is referred to below as a field of focus. In some embodiments, the field of focus is a sub-region on the display screen that a designer of the navigation application (that produces the navigation presentations) has designated as the desired location for showing the puck and important points about the puck and the route (e.g., points being framed).

In some embodiments, the puck is the only point that has to be framed in the collection of points that the VC engine tries to have the virtual camera frame in the framing mode. For instance, in some embodiments, a style can define a bounding shape (e.g., a bounding box) that is defined about the puck for a particular framing operation that is associated with the style. During framing, the VC engine projects the collection of points being framed to the display screen coordinate system (e.g., based on the virtual camera's expected, unadjusted position for the next navigation scene). A framing bounding shape (e.g., bounding box) is then defined in the screen space about the projection of the collection of points. The VC engine then uses the puck's bounding shape to determine how much the virtual camera's origin can be offset to capture as many of the collection of points being framed. This operation clips the framing bounding shape. The zoom level of the virtual camera is then adjusted to align one of the sides of the framing bounding shape with one of the sides of the sub-region that represents the display screen's field of focus.

Because there are changes in the navigation context while the puck travels along the navigated route, it is often advantageous for the virtual camera to capture more of the useful areas around or ahead of the puck by completely or partially disassociating its angular rotation and/or origin offset from that of the puck. For example, when a traffic incident (e.g., an accident, road construction, object on the road, traffic congestion, etc.) is detected on the route ahead of the puck, the VC engine in some embodiments switches from operating the virtual camera in the tracking mode to operating it in the framing mode, so that it can frame the location of the puck with the location of the traffic incident or the location of a detour route that goes around the location of the traffic incident. In some embodiments, the virtual camera performs this framing operation from a top-down 2D point of view, while in other embodiments, the virtual camera performs this framing operation from a perspective 3D point of view.

The type of road being navigated is another type of context that may affect how the VC engine operates the virtual camera. For instance, on windy roads or on highways/freeways, the VC engine in some embodiments repeatedly selects successive upcoming points on the route ahead of the puck for the virtual camera to frame along with the puck and the intervening points along the route. In some embodiments, the VC engine selects the upcoming points to be farther along the route when the posted speed limit for the road type is faster (e.g., the upcoming points are 2 miles from the puck on freeways, 1 mile from the puck on highways, and 0.5 miles on windy roads).

Also, in some embodiments, the upcoming point for each navigation scene is used to define the virtual camera's orientation (e.g., the VC engine points, or tries to point, the virtual camera in some embodiments to the upcoming point). Because the upcoming points are used for framing a collection of points and/or for identifying the virtual camera orientation, the curvature in the road ahead can cause the virtual camera and the puck to rotate independently of each other. Specifically, by using the upcoming locations along the route for orienting the camera and/or for framing, the VC engine in some embodiments can allow the puck to rotate independently of the map while this engine operates the virtual camera in the framing mode for certain road types. For instance, in some of these embodiments, when these upcoming locations fall within a first, inner angular range of the puck's orientation, the VC engine rotates the camera with the puck. However, when these upcoming locations fall within of a second, outer angular range of the puck's orientation, the VC engine of some embodiments maintains the virtual camera pointed on the upcoming locations, which allows the puck to rotate independently of the map as it travels along the route.

The VC engine in some embodiments operates the virtual camera in a framing mode when the puck is reaching a freeway and/or highway exit that is used by a maneuver along the navigated route. For instance, in some embodiments, the virtual camera starts to frame the puck and the exit used by a maneuver, as the puck is within a threshold distance of the exit. As the puck gets closer to this exit, the virtual camera in some of these embodiments zooms in to try to maintain the puck and exit within the desired field of focus on the display screen. In some embodiments, the virtual camera performs this framing operation from a perspective 3D point of view (e.g., a high zoom 3D point of view), while in other embodiments, the virtual camera performs this framing operation from a top-down 2D point of view.

At times, one exit has multiple ramps that connect to different streets or to different directions of travel along the same street. In such situations, the method of some embodiments identifies, highlights, or displays the ramp that is used by the route maneuver differently than the other nearby ramps. To help differentiate this ramp from the other nearby ramps, the method of some embodiments directs the virtual camera to frame this ramp along with the puck and one or more of the other nearby ramps. This framing allows the user to clearly view the ramp that needs to be used in the context of other nearby ramps. The VC engine in some embodiments has the virtual camera frame the relevant ramp along with a maximum number N (e.g., 2) of other nearby ramps.

The VC engine of some embodiments has the virtual camera frame a group of upcoming maneuvers along the navigated route when these maneuvers meet a set of grouping criteria. Based on the grouping criteria, the method of some embodiments identifies one or more groups of upcoming maneuvers dynamically for the navigation presentation after the navigation presentation is requested (i.e., the method does not require these maneuvers to be statically grouped before the navigated route is identified). By framing the group of upcoming maneuvers, the virtual camera can produce a navigation presentation that displays several upcoming maneuvers that are near each other, in order to highlight one or more maneuvers that follow the next maneuver in the route. For this framing, the puck can appear at offset locations and can rotate independently of the map (i.e., of the virtual camera).

The VC engine of some embodiments also operates a virtual camera in a framing mode (1) when the puck passes an arrival point, and/or (2) when the puck is off the road network (e.g., is in a parking lot) and needs to reach a departure point to start navigating to the destination. In both of these cases, the VC engine has the virtual camera frame the puck and the arrival/departure point in order to help the user direct the puck towards the arrival/departure point. This is highly useful when a user is having a hard time finding the departure or arrival point, as it keeps the departure/arrival point in the presentation's field of focus while the puck moves around to reach the point. In some embodiments, the VC engine also has the virtual camera to frame other points in addition to the puck and the arrival/departure point, such as nearby points of interest (e.g., parking lot or building).

In some embodiments, the virtual camera and the puck not only can be horizontally offset from each other, but also can be vertically offset from each other. In some embodiments, this vertical offset can make the puck move up or down the screen during the navigation presentation (i.e., can make the puck be at different vertical positions on the screen at different instances in the navigation presentation). For instance, the puck can be vertically offset in order to move up or down the screen while the virtual camera frames the puck moving along a roundabout. Having the puck move up the screen is also useful when the puck has to make a U-turn, in order to show more of the route after the turn. For U-turns, the VC engine in some embodiments not only allows the puck to move up the screen, but also require the puck to be at the top of the frame captured by the virtual camera.

One of ordinary skill will realize that the preceding Summary is intended to serve as a brief introduction to some inventive features of some embodiments. Moreover, this Summary is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide several novel methods for generating a navigation presentation that displays a device navigating a route on a map. The method of some embodiments uses a virtual camera that, based on detected changes in the navigation context, dynamically modifies the way it captures portions of the map to produce different navigation scenes in the navigation presentation. In some embodiments, a virtual camera is a conceptual representation of the field of view that is defined to emanate from a particular location and orientation in the 3D map coordinate system.

To generate the navigation scenes, the method of some embodiments (1) identifies different sets of attributes that describe the different navigation contexts at different times during the navigation presentation, and (2) uses these different sets of attributes to identify different styles for operating the virtual camera. In some embodiments, the method uses an identified style to specify the virtual camera's positional attributes, which, in turn, define the portions of the map that the virtual camera identifies for rendering to produce several navigation scenes for a period of time (e.g., until the navigation context changes, or until the navigation presentation ends when the navigation context does not change again). During the navigation presentation, each time the navigation context changes, the identified set of attributes may change. This change, in turn, may cause the method of some embodiments to select a new style for operating the virtual camera. When the style for operating the virtual camera changes, the method of some embodiments modifies the way the virtual camera captures the portion of the map to render.

Figure 1:
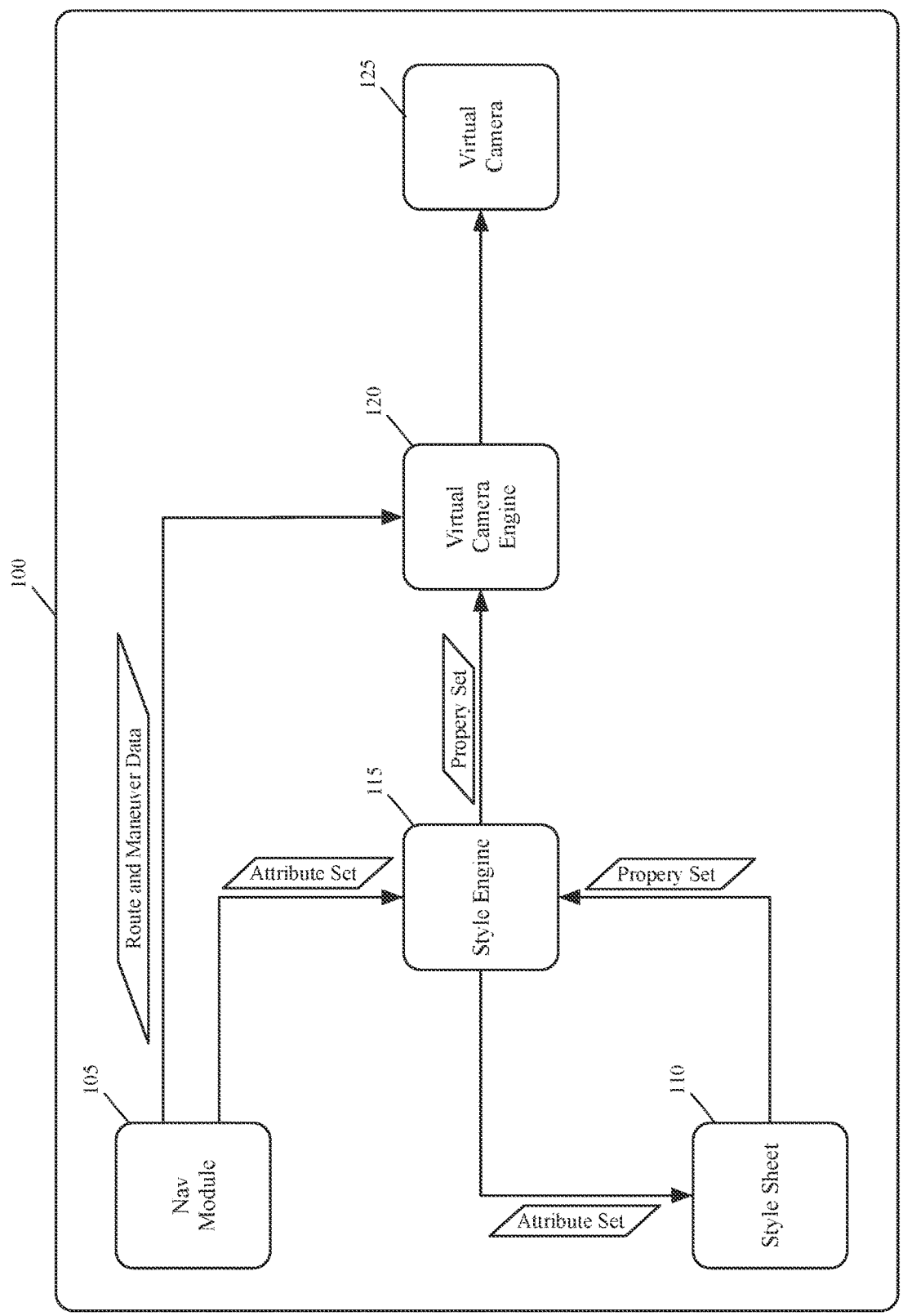
FIG. 1 illustrates a navigation application that implements the method of some embodiments of the invention.

FIG. 1 illustrates a navigation application 100 that implements the method of some embodiments of the invention. The navigation application executes on a device (e.g., a mobile device, a vehicle electronic system, etc.) to generate a navigation presentation that shows the device navigating to a destination. During the navigation presentation, the navigation application detects changes in the navigation context, selects new virtual camera (VC) styles based on the detected changes, and operates its virtual camera based on the selected VC styles to define the navigation scenes for rendering. Because of its style-driven virtual camera, the navigation application can dynamically modify the way it generates the navigation scene during the navigation presentation as the navigation context changes. Moreover, this approach allows navigation presentation styles to be easily modified without having to modify the navigation application's code, by simply having navigation application download new styles and use these styles to define how it should generate its navigation presentations.

As shown, the navigation application 100 includes a navigation module 105, a style sheet 110, a style engine 115, a virtual camera engine 120, and a virtual camera 125. The navigation module 105 in some embodiments (1) uses an internal or external route identifying service to identify a route for the device to navigate to the destination, (2) uses the device's location services (e.g., GPS services) to identify the position of the device as it travels in a region, (3) correlates this position to locations on or near the generated route, and (4) generates sets of attributes that describe the different navigation contexts at different times during the navigation presentation. Examples of such attributes include the type of road currently being navigated, the posted speed limit for the current road, the distance to the next maneuver in the route, the type of next maneuver (e.g., whether the maneuver is a grouped maneuver, a roundabout, an exit ramp, close to other upcoming maneuvers, etc.), the navigation status (e.g., on-route, off-route, recalculating-route), etc.

In some embodiments, each attribute set has several attributes (e.g., fifty attributes), and each time one of these attributes changes, the attribute set changes. In some embodiments, a change in the attribute set is viewed as a change to the navigation context. Each time the attribute set changes, the navigation module 105 in some embodiments provides this new attribute set to the style engine 115. In other embodiments, the style engine 115 iteratively queries the navigation module 105 for the current attribute set that defines the current navigation context. In either of these approaches, the style engine 115 of the navigation application 100 can repeatedly receive, from the navigation module 105, sets of attributes that express different navigation contexts at different instances of the navigation presentation.

Each time the style engine 115 receives a new attribute set from the navigation module 105, it examines the VC styles stored in the style sheet 110 to identify a VC style that matches the new attribute set. The style sheet 110 is a data structure that stores several styles. In some embodiments, the navigation application can download new styles from a set of servers, which it then stores in the style sheet 100. Instead of downloading styles and storing them in the style sheet, the navigation application in some embodiments downloads a new VC style sheet each time the set of servers has an updated VC style sheet.

For each style, the style sheet 110 in some embodiments stores (1) a style identifier, and (2) a set of style properties. In some embodiments, the style identifier of a style is defined in terms of a set of attributes. Thus, to identify a VC style that matches a newly received attribute set, the style engine 115 in some embodiments compares the newly received attribute set with the set of attributes of the stored styles in order to identify a style with a matching attribute set. In some embodiments, the style identifiers are derived (e.g., are computed) from the associated attribute sets of the styles. For instance, in some embodiments, the style identifiers are hash values of the attribute sets. To identify a matching style, the style engine in these embodiments compares the newly received attribute set with the style identifiers, by first generating a hash of a newly received attribute set, and then using the computed hash value to identify a style in the style sheet with a matching style identifying hash value.

After identifying a style for a newly received attribute set, the style engine 115 determines whether the identified style is different from the previously identified style that is currently being used to define the operation of the virtual camera 125. If not, the style engine 115 does not provide the VC engine a new style or a new set of VC properties. However, when the identified style is different from the previously identified style, the style engine 115 provides the new style's associated set of VC properties to the VC engine 120 of the navigation application.

The VC engine 120 identifies positional attributes of the virtual camera based on the properties sets of the VC styles that it receives from the style engine 115. These positional attributes, in turn, define the portions of the map that the virtual camera identifies for rendering to produce several navigation scenes for a period of time (e.g., until the navigation context changes, or until the end of the navigation presentation when the navigation context does not change again). When the navigation module 105 identifies different attribute sets to describe different navigation contexts, and the style engine 115 identifies different VC styles based on these different attribute sets, the style engine 115 provides to the VC engine 120 different VC styles that specify different VC properties, which cause this engine to specify different ways that the virtual camera should define the portion of the map to render.

Based on a style's associated set of properties, the VC engine 120 of some embodiments identifies the virtual camera's angular pitch (e.g., from top-down position to a perspective angular position), the virtual camera's rotation (e.g., in an X-Y plane defined by x- and y-axes of the map's coordinate system), and the virtual camera's distance from a region on the map that it targets, e.g., from a location of a puck that represents the device in the navigation presentation as the puck navigates along a route in the presentation. In some embodiments, the virtual camera has a system of springs that specify its angular pitch, rotation, and height, and a style's associated set of properties are used to define one or more parameters of the spring system. The spring system in some embodiments also includes a spring for the position of the puck on the screen that displays the navigation presentation (i.e., the display screen on which the virtual camera captured view is projected). These embodiments use the spring system because this system provides an implicit way to specify the virtual camera's movement at different instances in time and an easy way to create the navigation presentation's animation. This is because the spring's properties (e.g., stiffness, damping, rest length, etc.) provide a set of parameters that the VC engine can rely on to bring the virtual camera's properties to their desired state smoothly.

In some of these embodiments, the VC engine operates the virtual camera either in a tracking mode or a framing mode. During the tracking mode, the virtual camera tracks the puck along the route and maintains the device-representing puck (referred to below as the "puck") at desired location(s) on the display screen that displays the navigation presentation. The display screen is the display screen of the device in some embodiments, while it is a display screen that is being driven by the device in other embodiments. In the framing mode, the virtual camera defines frames (e.g., bounding polygons) to capture collection of points along the route (including the puck's location), and displays these frames at a desired region of interest on the display screen as the puck travels along the route. This region of interest on the display screen is referred to as a field of focus in some embodiments.

To generate the navigation presentation, the navigation application of some embodiments uses the following four coordinate systems: (1) a map coordinate system, (2) a puck coordinate system, (3) a virtual camera coordinate system, and (4) a display screen coordinate system. In some of these embodiments, the first three coordinate systems are three dimensional systems, with x-, y-, and z-axes, while the fourth coordinate system is a two dimensional system with x- and y-axes.

Figure 2:
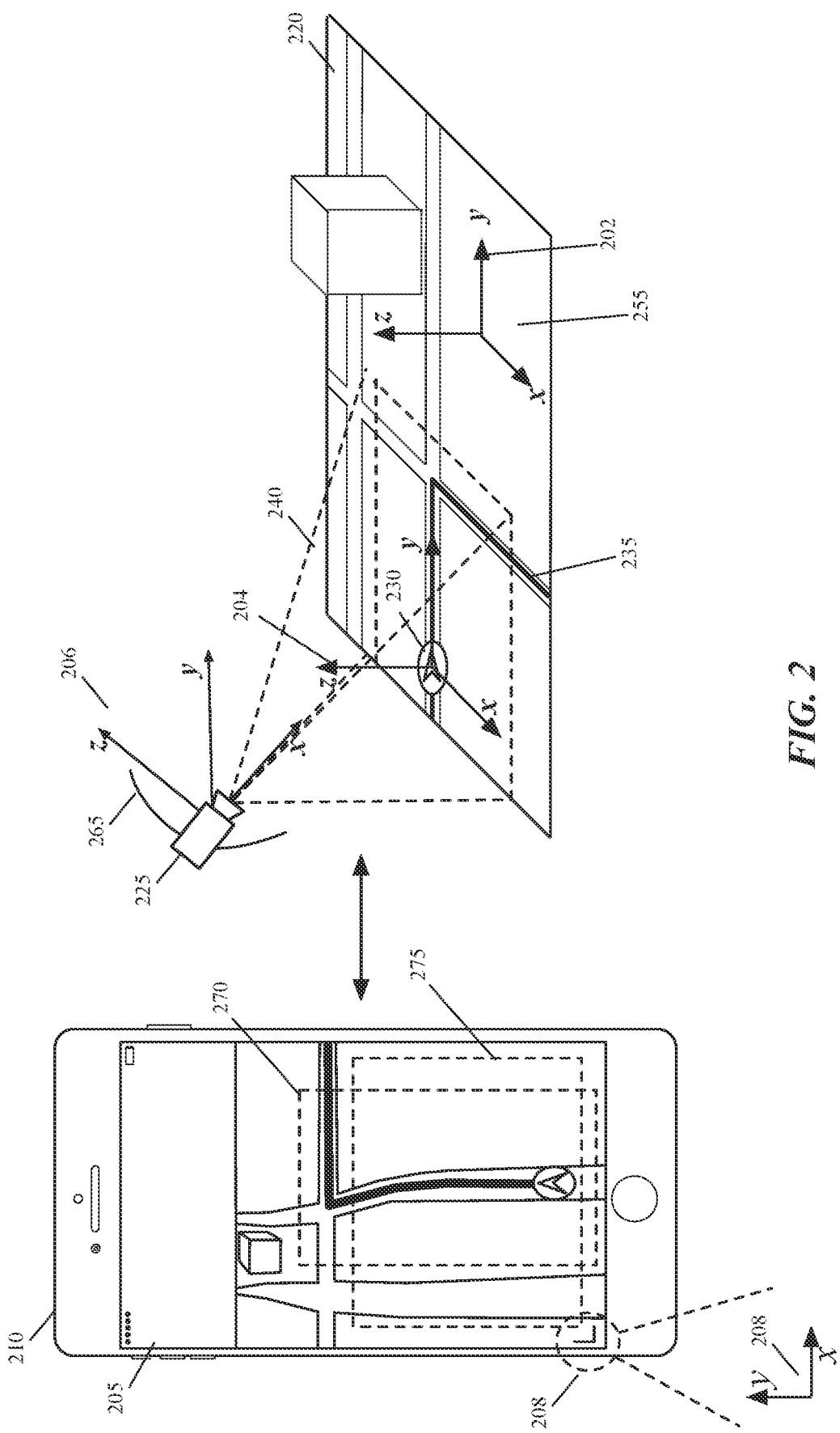
FIG. 2 illustrates examples of four coordinate systems used by the navigation application of some embodiments.

FIG. 2 illustrates an example of these four coordinate systems. Specifically, it illustrates a 3D map 220 of a region that is being captured by a virtual camera 225 as a puck 230 traverses along a route 235. In this example, the virtual camera is at a perspective 3D position in a 3D map coordinate system 202. From this perspective 3D position, the virtual camera defines a 3D perspective field of view 240 that serves as all of, or a portion of, a 3D navigation scene of the 3D navigation presentation. The virtual camera is a conceptual representation of the field of view that is defined to emanate from a particular location and orientation in the 3D map coordinate system.

FIG. 2 also illustrates a puck coordinate system 204, a VC coordinate system 206, and a display screen coordinate system 208 (which is shown in small form on the screen and a larger form off the screen). This figure also illustrates an arc 265 that represents the virtual camera angular tilt pitch towards the map. In some embodiments, the virtual camera can have a pitch that ranges from top-down view (that defines a 2D view of the map) to a low perspective pitch (that defines a low perspective view of the map).

In this example, the display screen 205 is the display screen of a mobile device 210 on which the navigation application executes. In other embodiments, the display screen is a display screen of another device (e.g., a display screen of an information system of a vehicle) that is driven by the mobile device 210. In other embodiments, the vehicle information system executes the navigation application, and this application drives one or more display screens of this system.

Also, in the example illustrated in FIG. 2, the map, puck and camera coordinate systems 202, 204, and 206 are three dimensional systems, with x-, y-, and z-axes, while the display screen coordinate system 208 is a two dimensional system with x- and y-axes. When the virtual camera is at a perspective 3D position, the 3D navigation scene that it defines in its field of view 240 is projected onto the 2D coordinate system of the display screen by using a perspective-projection transform in some embodiments. The projection of this field of view 240 is illustrated as box 270 in FIG. 2.

During tracking mode, the VC engine 120 in some embodiments maintains the same angular orientation (e.g., a zero angular offset) between the VC's coordinate system 206 and the puck's coordinate system 204 in the x-y plane 255 of the map's coordinate system. For instance, in some embodiments, the virtual camera 225 points in the same direction as the puck during the tracking mode in some embodiments. Also, during the tracking mode, the VC engine 120 in some embodiments maintains the positional relationship (e.g., a zero offset) between the origins of the VC's coordinate system 206 and the puck's coordinate system 204. In other embodiments, during tracking mode, the VC engine 120 usually maintains the angular orientation and/or positional relationship between the VC and puck coordinate systems, but allows the angular orientation and/or positional relationship between these two coordinate systems to change for a transient period of time (e.g., the time during which the puck makes a left or right turn) to show more context around a maneuver.

During framing mode, the VC engine 120 in some embodiments completely or partially disassociates the angular rotation of the virtual camera's coordinate system 206 and the puck's coordinate system 204. This allows the puck to rotate separately from the map during the framing mode, and allows the virtual camera 225 to capture more of the desired region of interest during this mode. During framing mode, the VC engine 120 in some embodiments no longer requires the origin of the VC's coordinate system 206 to be held at a particular offset (e.g., zero offset) with respect to the puck's coordinate system 204. This allows the virtual camera 225 to assume a variety of offset positions to capture more of the useful map areas around or ahead of the puck 230.

In some embodiments, the VC engine 120 completely or partially disassociates the positional and angular relationships of the virtual camera 225 and the puck 230 during the framing mode by having the virtual camera frame a collection of points (e.g., points along the route, including the puck) for display at the field of focus on the display screen. In some embodiments, the field of focus is a region on the display screen that designers of the navigation application have designated as the desired location for showing the puck and important points about the puck and the route (e.g., points being framed, such as the puck and nearby maneuvers). FIG. 2 illustrates one example of a field of focus 275 on the display screen 205 of the mobile device 210.

During the framing mode, the VC engine 120 of some embodiments initially defines the virtual camera parameters that would define a VC field of view that frames the collection of points. After identifying these virtual camera parameters, the VC engine in some embodiments adjusts the virtual camera parameters (e.g., zoom level) in order to try to display the virtual camera's field of view at desired region(s) of interest on the display screen as the puck travels along the route. For example, in some embodiments, the puck is the only point that has to be framed in the collection of points that the VC engine tries to have the virtual camera frame in the framing mode. In some of these embodiments, a style can define a bounding shape (e.g., a bounding box) that is defined about the puck for a particular framing operation that is associated with the style.

During framing, the VC engine projects the collection of points being framed to the display screen coordinate system (e.g., based on the virtual camera's expected, unadjusted position for the next navigation scene). A framing bounding shape (e.g., bounding box) is then defined in the screen space about the projection of the collection of points. The VC engine then uses the puck's bounding shape to determine how much the virtual camera's origin can be offset to capture as many of the collection of points being framed. This operation clips the framing bounding shape. The zoom level of the virtual camera is then adjusted to align one of the sides of the framing bounding shape with one of the sides of the sub-region that represents the display screen's field of focus.

Figure 3:
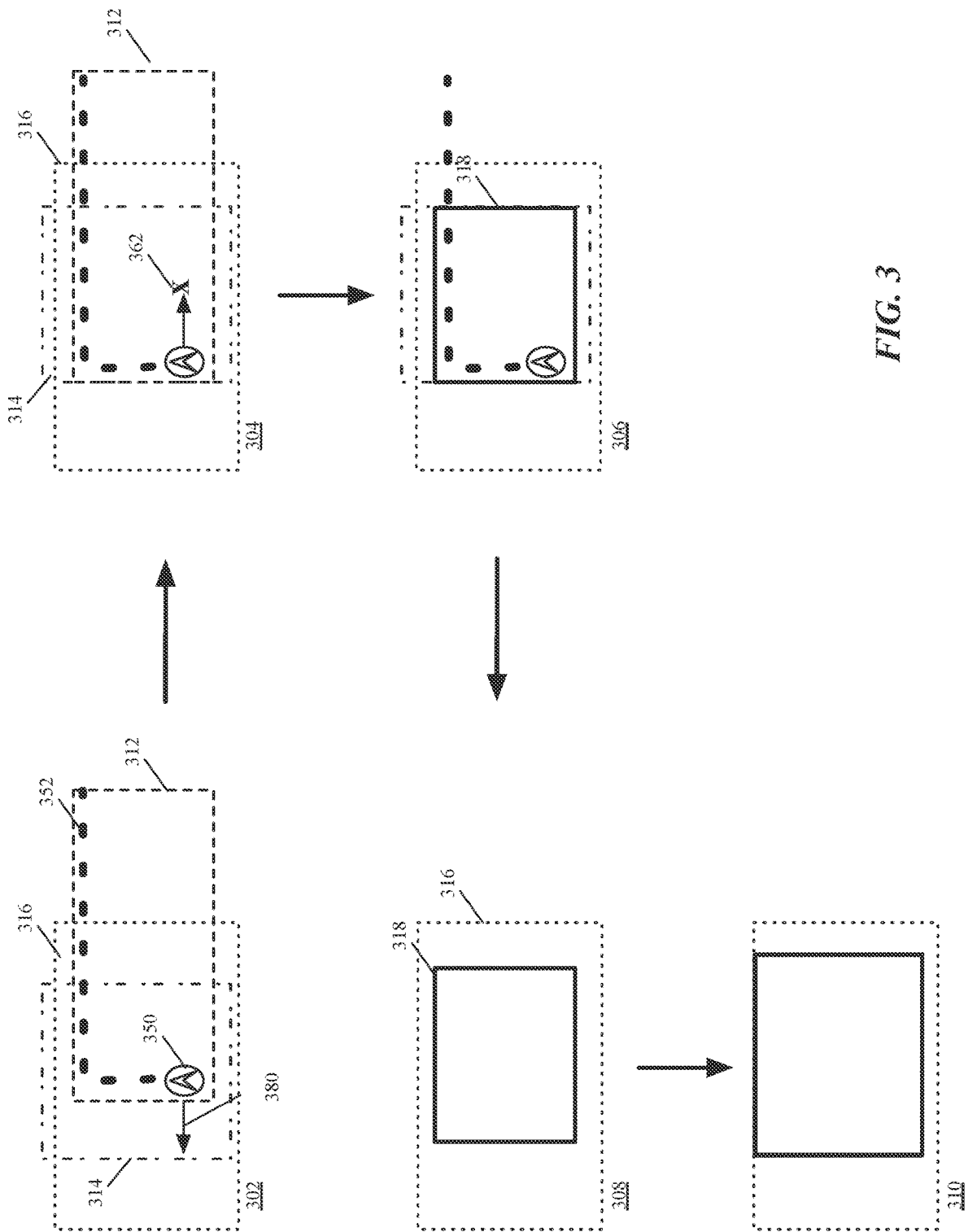
FIG. 3 illustrates an example of several operations that the navigation application of some embodiments performs to frame a scene.

FIG. 3 illustrates an example of these operations in five stages 302-310. As shown in this example, the VC engine operates the virtual camera in a framing mode to capture more of an upcoming right or left turn in some embodiments. The first stage shows an initial framing box 312 that bounds a collection of points that include the puck 350 and a series of upcoming points 352 along a route. In this example, the puck is about to make a right turn along the route. The initial framing box 312 bounds the collection of points that the VC engine ideally wants the virtual camera to frame. In some embodiments, the displayed collection of points have been projected onto the display screen coordinate system from the map's 3D coordinate system by using a perspective projection transform.

The first stage 302 also shows the puck's bounding box 314 and the display screen's field of focus 316. As mentioned above, the style used by the VC engine for the framing operation defines the puck's bounding box, which is a box that identifies acceptable locations for the puck in the screen space coordinate system. The field of focus 316 is a box on the display screen that designers of the navigation application have designated as the desired location for showing the puck and important points about the puck and the route. The first stage 302 is shown based on the virtual camera's expected, unadjusted position for the next navigation scene (e.g., based on where the spring system will identify as the next desired view of the virtual camera).

For the camera to capture the points in the initial framing box 312, the camera has to move to the right, which would push the puck to the left on the display screen. Fortunately, the puck can move to the left by an amount 380 that is defined by the left side of the puck's bounding box 314, as shown by the second stage 304. In moving to the left in its bounding box, the puck has also moved to the left in the screen's field of focus 316. The second stage 304 shows the new position of the camera as 362; in this example, it is assumed that the camera's prior position (in the first stage 302) was aligned with the puck.

The rightward movement of the camera allows the camera to capture more of the collection of points after the upcoming right turn. After identifying the virtual camera offset in the second stage 304, the VC engine clips the framing box 312 with the puck's bounding box 314. The third stage 306 shows the result of this clip by displaying the modified, clipped framing box 318 with thick, solid lines. After this clipping, the two boxes that matter are the focus box 316 and the modified framing box 318, which are shown in the fourth stage 308.

The modified framing box 318 corresponds to a particular zoom level of the virtual camera. After this clipping, the VC engine adjusts the zoom level of the virtual camera so that at least one of the sides of the modified framing box 318 overlaps one of the sides of the focus box 316. This overlap is illustrated in fifth stage 310. This overlap was achieved by adjusting the zoom level of the virtual camera. In some embodiments, the VC engine does not change the zoom level between successive scenes during framing mode unless the new zoom level is at least a threshold minimum amount different than the prior zoom level. This constraint helps ensure that the VC engine does not constantly change the zoom level (e.g., on a windy road where the puck is traveling fast along opposing close by turns).

Figure 4:
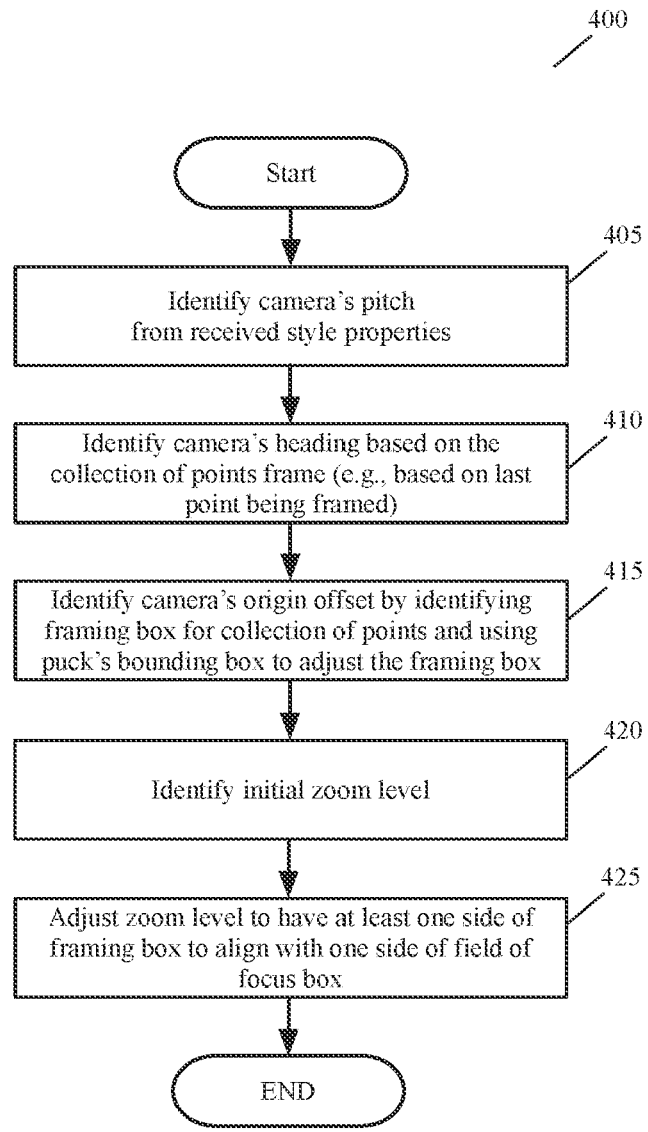
FIG. 4 illustrates a process that the virtual camera engine performs in order to have the virtual camera frame a collection of points for one navigation scene of the navigation presentation.

FIG. 4 illustrates a process 400 that the VC engine 120 performs in order to have the virtual camera frame a collection of points for one navigation scene of the navigation presentation. In some embodiments, the VC engine performs this process for each navigation scene that the virtual camera has to define while it operates in a framing mode to frame a collection of points. As shown, the process 400 initially defines (at 405) the virtual camera's pitch to the pitch property value that is specified in the current VC style.

Next, at 410, the process identifies the camera heading based on one or more of the points in the collection of points. In some embodiments, to define the heading of the virtual camera, the process 400 selects one or more of the more important points in the collection of points to frame, such as the last point in the collection of points. For example, when framing a group of maneuvers, the process defines the direction of the camera to point to the last maneuver in the group. In some of these embodiments, the direction of the camera is specified as an angle that has the angle of a vector that starts from the origin of the camera and ends at the last point in the collection of points being framed. The VC engine of some embodiments limits the camera heading identified by this vector with a pair of min/max heading properties, which are provided in the VC style in some embodiments.

At 415, the process identifies the virtual camera's origin offset with respect to the puck's origin. To do this, the process 400 in some embodiments performs the operations described above by reference to FIG. 3. Specifically, the process (1) projects the collection of points being framed to the display screen coordinate system, (2) identifies a framing bounding box in the screen space to bound the projections of the collection of points, (3) uses the puck's bounding box to identify the offset and to modify the framing box. In some embodiments, the process projects the collection of points by using the view matrix that is computed based on the spring system's expected position of the virtual camera for the next scene. The view matrix in some of these embodiments accounts for the pitch and orientation parameters that were identified at 405 and 410, while it does not account for these parameters in other embodiments.

In some embodiments, the process 400 computes the project based on the resting camera frame. This camera frame uses the current location of the puck, the ideal heading and pitch, and the current distance from the target point as computed in the previous frame. In some embodiments, the ideal heading is computed based on the state of the application and the style sheet, while the ideal pitch is computed based on the style sheet. The projection is used to project the points to the frame, which are then used to compute a new target distance and a new target position of the puck on the screen.

Next, at 420, the process identifies a zoom level for the virtual camera based on the modified framing box identified at 415. Lastly, the process adjusts (at 425) the virtual camera's zoom level until at least one of the sides of the framing box overlaps one of the sides of the focus box. After 425, the process ends. In some embodiments, the VC engine tries to set one or more of the VC parameters (e.g., pitch, orientation, zoom level, etc.) to the values identified by the process 400, but in some cases, it does not set these parameters to these values based on one or more constraints that it has to respect, such as the zoom level constraint described above for windy roads. Also, in the above described examples of FIGS. 2-4, the virtual camera's field of view only defines a portion of the navigation scene displayed on the screen. To define the entire navigation scene, the VC engine selects buffer boundaries around the virtual camera's field of view that define the entire navigation scene for rendering. In other embodiments, the VC engine uses two different virtual cameras, a first virtual that is a stylized camera that defines the content of the framing box in the field of focus, and a second virtual camera that is aligned with the orientation of the first camera but captures a larger scene that includes the scene captured by the first virtual camera.

Figure 5A:
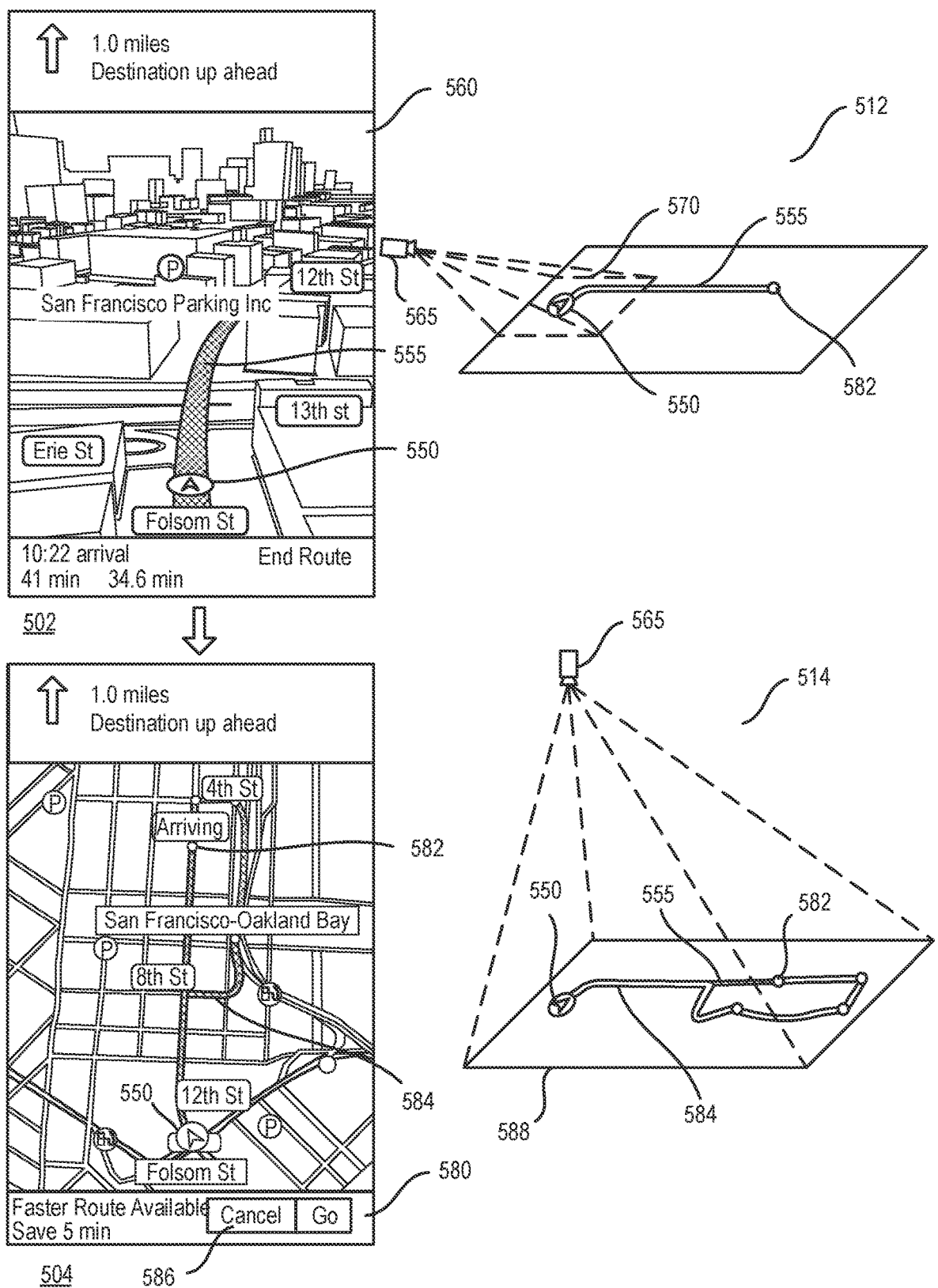
FIGS. 5A and 5B illustrate an example of how the navigation application of some embodiments operates when a traffic incident is detected along a navigated route.
Figure 5B:
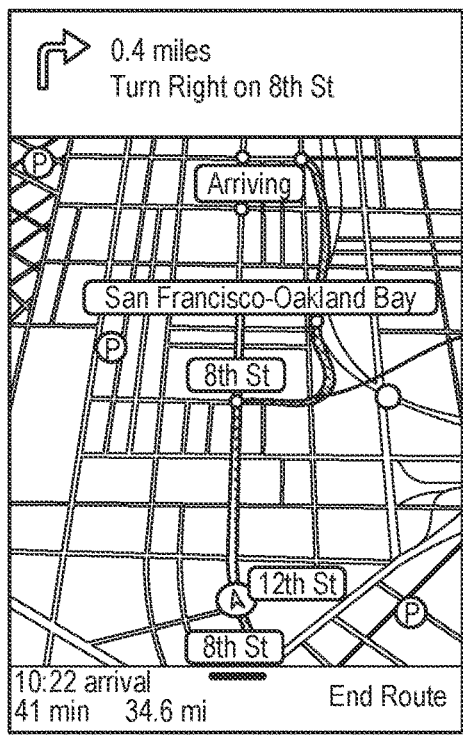
Figure 5B:
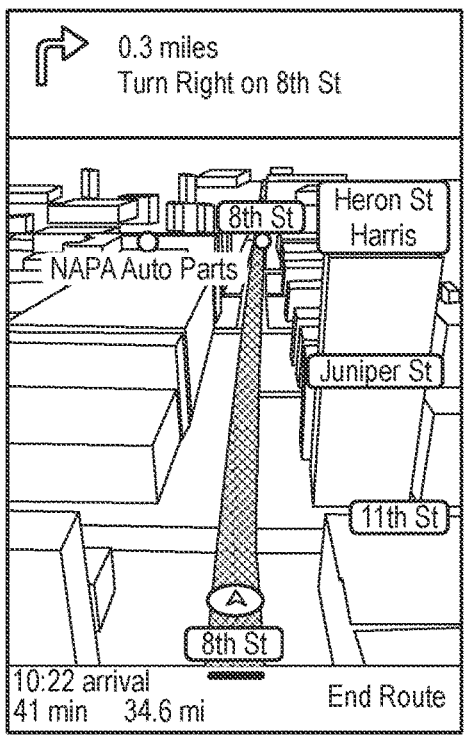
Figure 5B:
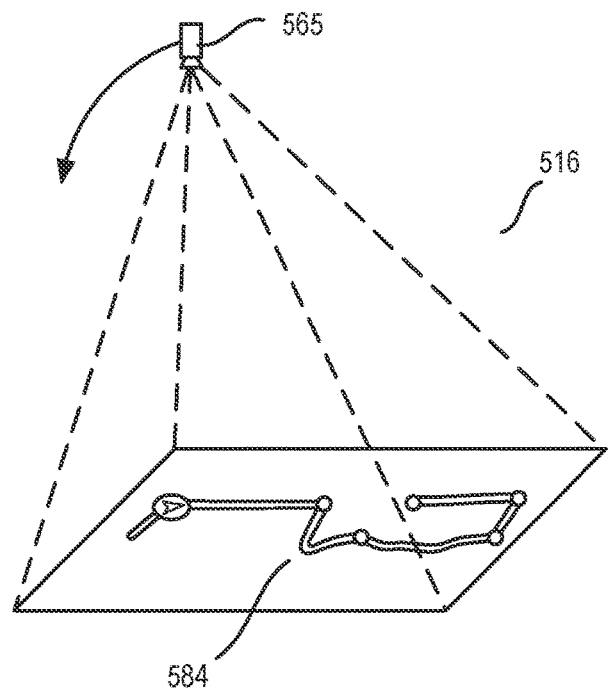
Figure 5B:
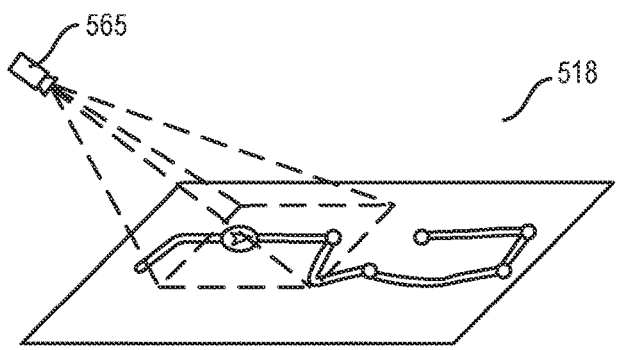

A traffic incident along a navigated route is one type of change in the navigation context that prompts the navigation application of some embodiments to switch to a framing mode of operation to frame a collection of upcoming points along the route in order to provide the user with a view what lies ahead on the route. FIGS. 5A and 5B illustrate an example of how the navigation application of some embodiments operates when a traffic incident is detected along a navigated route. This example is illustrated in terms of four navigation scenes 502-508 of a navigation presentation that is provided by the navigation application of some embodiments. For each of these navigation scenes, FIGS. 5A and 5B also illustrate an operational stage 512, 514, 516, or 518 that shows the position of a virtual camera 565 that is used to generate the navigation scene.

The first scene 502 shows a puck 550 navigating along a route 555 in a 3D map scene 560. This scene 502 is generated based on a field of view 570 of the virtual camera 565 from the perspective 3D position shown in the first stage 512. As the puck 550 travels along the route 555, it nears a location 582 in the route that has an associated traffic incident, such as an accident, road construction, traffic congestion or other incident. The navigation module 105 detects this incident, and identifies a new route 584 that avoids the location of this incident. As further described below, the new route is similar to the old route 555 in this example, except that the new route has a detour portion that goes around the incident location 582 in the old route. In other cases, the new route might differ more substantially from the old route (e.g., might not overlap with the old route after the location of where the two routes diverge).

After detecting the traffic incident, the navigation module 105 produces an attribute set that specifies an upcoming traffic incident, and provides this attribute set to the style engine 115. In some embodiments, the navigation module 105 also provides a set of locations to frame in the new route to the VC engine 120. Based on the new attribute set, the style engine 115 identifies a new VC style in the style sheet 110, and provides the parameter set of this new VC style to the VC engine 120. The VC engine 120 then uses the provided parameter set to define the positional attributes (e.g., pitch, orientation and height) of the virtual camera so that the virtual camera can frame the desired locations along the old route and the new route at the desired location (e.g., within the field of focus) on the display screen. In some embodiments, the collection of points for framing are the location of the puck, a set of one or more locations on the current route at or near the location of the traffic incident, and a set of one or more locations on the new route that circumvents the incident location.

It is important to note that all of these operations are performed without any input from the person viewing the navigation presentation. In others words, after detecting the traffic incident, without receiving any user input, the navigation application switches from its tracking mode to a framing mode that produces several scenes that frame the puck and the locations along the current and new routes 555 and 584. The second scene 504 of FIG. 5A is one of these scenes. As shown, the second scene 504 is a top-down 2D view of the puck 550, the incident location 582, and the new route 584.

The second stage 514 shows that to produce this 3D view, the virtual camera 565 moves to a position that allows it to frame the puck 550, the incident location 582, and the new route 584 in its field of view 588, as it points straight down towards the map. In some embodiments, the navigation application produces a sequence of scenes between the first and second scenes 502 and 504 that provide a smooth navigation animation that shows the navigation view switching from a 3D perspective position behind the puck to top-down 2D view shown in the second stage 514. The virtual camera's changing fields of view produce this animation as the virtual camera moves from the perspective 3D view of the first stage 512 to the top-down 2D view of the second stage 514.

In some embodiments, the VC engine 120 receives a VC style (i.e., the VC property set) that specifies one or more parameters that define the framing behavior of the virtual camera. For instance, in some embodiments, the VC property set specifies that the virtual camera has to operate in framing mode from a top-down 2D view to frame the puck, the incident location along the current route, and the section of the new route that provides a detour around the incident location. While the virtual camera 565 frames these points in a top-down 2D view in the example of FIGS. 5A and 5B, the virtual camera in other embodiments frames these points from a high 3D perspective view and the supplied VC property set specifies this perspective view. In either the 2D or 3D view, the puck in some embodiments can appear to move and/or rotate independently of the map as the virtual camera frames the desired collection of points and hence is not strictly tied to the rotation and/or movement of the puck.

As shown, the navigation application presents with the second scene 504 a prompt 580 below the presentation, which identifies the identified new route 584 and provides a set of controls 586 to cancel or accept this new route. The new route 584 is displayed differently (e.g., has a different appearance, such as a different color, a different type or pattern of line, or is shown with a highlight, etc.) than the current route 555. In some embodiments, the navigation application automatically switches to the new route 584 when the user does not select the cancel option (to cancel this new route) within a particular time period. In other embodiments, the navigation application requires the user to affirmatively select the new route before switching to it (e.g., removes the presentation of the new route when the user does not affirmatively select the new route within a certain duration of time).

As shown in FIG. 5B, the third scene 506 is a scene in the navigation presentation after this presentation has switched from the first route 555 to the new route 584. The navigation application in some embodiments automatically switches to this new route without user input when the user does not select the cancel option 586. To show this switch, the virtual camera 565 stays in its top-down position for a period of time, as shown by the third stage 516.

However, after a time duration following the switch to the new route 584, the virtual camera 565 switches back to its 3D perspective view, as shown by the fourth stage 518. As shown in this stage 518, the virtual camera 565 moves to a 3D perspective position behind the puck to produce a 3D perspective view of the route and the puck. In switching back to a perspective 3D position, the virtual camera switches from operating in its framing mode back to operating in its tracking mode. The fourth scene 508 provides a 3D perspective view of the puck 550, the new route 584 and the map.

In some embodiments, the navigation application might not be able to identify a new route that avoids a traffic incident along the device's current route. In some such embodiments, the navigation application still changes the virtual camera's pitch, origin offset and/or angular rotation to show the puck and the incident location in either a top-down 2D view or a perspective 3D view. To show the incident location, the virtual camera switches from its tracking mode to its framing mode so that it can frame the location of the puck and the incident location for a period of time. In some embodiments, the virtual camera returns to its position behind the puck after showing the incident location for a period of time.

In some embodiments, the VC engine 120 does not change the virtual camera's style to capture an incident along the current route, when the puck is near a junction along the current route at which the puck has to perform a maneuver (e.g., make a turn, etc.). In these embodiments, the VC engine 120 waits until the puck finishes the nearby maneuver at the nearby route juncture, before switching to a new VC style (i.e., before adjusting the virtual camera's properties based on the new VC style received from the style engine 115).

The type of road being navigated is another type of context that may affect how the VC engine operates the virtual camera. For instance, on windy roads or on highways/freeways, the VC engine in some embodiments repeatedly selects successive upcoming points on the route ahead of the puck for the virtual camera to frame along with the puck and the intervening points along the route. In some embodiments, the VC engine selects the upcoming points to be farther along the route when the posted speed limit for the road type is faster (e.g., the upcoming points are 2 miles from the puck on freeway, 1 mile from the puck on highway, and 0.5 miles on windy roads).

Also, in some embodiments, the upcoming point for each navigation scene is used to define the virtual camera's orientation (e.g., the VC engine directs, or tries to direct, the virtual camera in some embodiments to point to the upcoming point). Because the upcoming points are used for framing a collection of points and/or for identifying the virtual camera orientation, the curvature in the road ahead can cause the virtual camera and the puck to rotate independently of each other. Specifically, by using the upcoming locations along the route for orienting the camera and/or for framing, the VC engine in some embodiments can allow the puck to rotate independently of the map while this engine operates the virtual camera in the framing mode for certain road types. For instance, in some of these embodiments, when these upcoming locations fall within a first, inner angular range of the puck's orientation, the VC engine rotates the camera with the puck. However, when these upcoming locations fall within of a second, outer angular range of the puck's orientation, the VC engine of some embodiments maintains the virtual camera pointed on the upcoming locations, which allows the puck to rotate independently of the map as it travels along the route.

Figure 6:
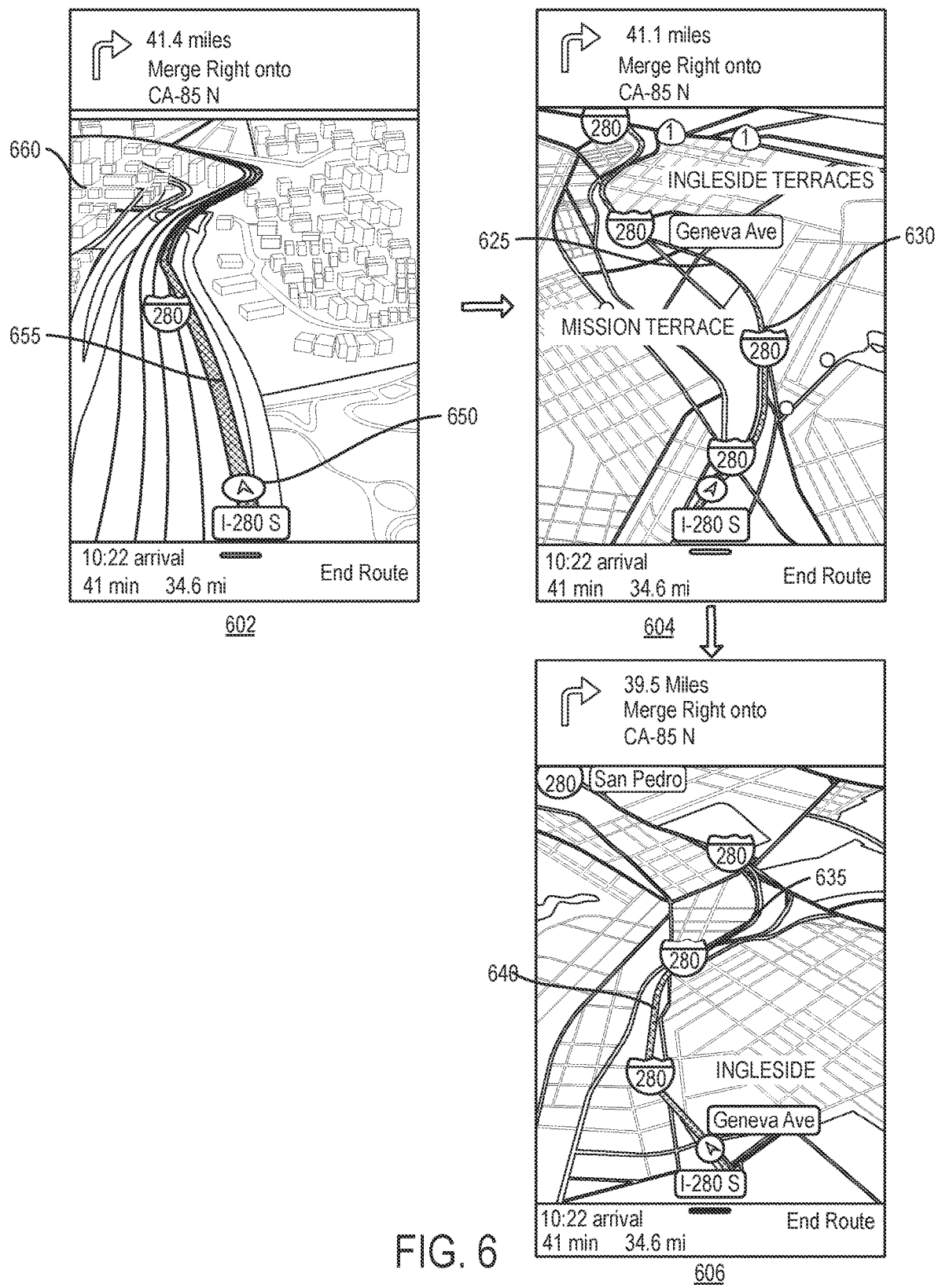
FIG. 6 presents an example that illustrates how the navigation application of some embodiments uses upcoming locations on a freeway to frame a collection of points on the route ahead of the puck.

FIG. 6 presents an example that illustrates how the navigation application of some embodiments uses upcoming locations on a freeway to frame a collection of points on the route ahead of the puck. In this example, the puck is traveling on a freeway and the upcoming locations are picked to be far off locations (e.g., 2 miles ahead) because presumably the puck will reach these locations sooner due to the faster speed limit posted for the freeway. On highways and slower windy roads, the VC engine uses upcoming locations that are closer to the puck due to the puck's expected slower speed of travel.

Also, the VC engine has the virtual camera operate at higher zoom levels as the posted speed limit becomes larger. For instance, when traveling on a freeway, the virtual camera zooms out to 1.5 miles in some embodiments, while operating at lower zoom levels for highways, and even lower ones for urban streets or rural roads. The higher zoom levels on the faster roads are meant to show more of the upcoming route, and incidents (e.g., traffic) and context, along the upcoming routes, which should be reached sooner based on the expected faster travel speeds on these roads.

In some embodiments, the VC engine 120 receives a VC style (i.e., the set of VC properties) that specifies several framing parameters for directing the VC engine on how to have the virtual camera frame the puck and the upcoming route as the puck travels along the freeway. Examples of such framing parameters include the 3D perspective view (e.g., a view with a particular pitch) of the virtual camera, the size of the puck's bounding box, the distance ahead on the route that the virtual camera should frame, and/or an ideal zoom level (e.g., 1.5 miles above the freeway). In some embodiments, the received VC style does not specify some of these parameters, and/or specifies other framing parameters.

The example illustrated in FIG. 6 is presented in three navigation scenes 602-606 of the navigation presentation. The first scene 602 is one of the early scenes after the navigation presentation has started or after the puck 650 has gotten on the freeway. This scene shows the puck 650 navigating along a route 655 in a 3D map scene 660. This scene 602 is generated based on a field of view of the virtual camera (not shown) from the perspective 3D position.

On freeways, the VC engine of some embodiments operates the virtual camera in a 3D perspective view from a high zoom level. Thus, after starting the navigation presentation in a low 3D perspective view, such as the first scene 602, the navigation presentation animates through a series of scenes until the camera starts to define scenes that are captured from high 3D perspective views. The second scene 604 is one such high 3D perspective view. This scene is generated by the VC engine 120 directing the virtual camera to frame (1) the puck, (2) an upcoming location 625 on the navigated freeway that is 2 miles from the location of the puck, and (3) intervening locations on the route between the puck and the upcoming location 625. The VC engine 120 also uses the position of the upcoming location to identify the orientation of the virtual camera (e.g., directs the camera to point to this location while framing the desired collection of points).

Framing the upcoming location 625 and the intervening points allows the virtual camera to show the bend 630 in the freeway between puck and the upcoming location 625. Also, by using the upcoming location 625 to direct the virtual camera, the navigation application can maintain the upcoming location at or near the center of the frame (i.e., at or near the midpoint of the top side of the frame) in order to show this location in the field of focus of the display screen. This manner of orienting the camera allows the puck to point in a different direction than the camera, which allows the puck to appear to rotate on top of the map (i.e., to rotate independently of the map) during the navigation presentation. The second scene 604 shows the puck pointing to the top-right quadrant of the map, instead of straight up direction, which is the direction that pucks are usually directed in the navigation presentations of other applications.

The third scene 606 is another scene in the navigation presentation. This scene is generated by the VC engine 120 directing the virtual camera to frame (1) the puck, (2) another upcoming location 635 on the navigated freeway that is 2 miles from another location of the puck, and (3) intervening locations on the route between the puck and the upcoming location 635. As the VC engine 120 now uses this location 635 to direct the virtual camera, the scene 606 shows another bend 640 in the freeway between puck and the upcoming location 635, and shows the puck pointing in a different direction, now pointing to the top-left quadrant of the map. While the puck travels between the different bends 630 and 640 in the freeway, the navigation application provides an animation in some embodiments that shows the puck rotating on the map between various different angular orientations including the two shown in the second and third scenes 604 and 606.

Figure 7:
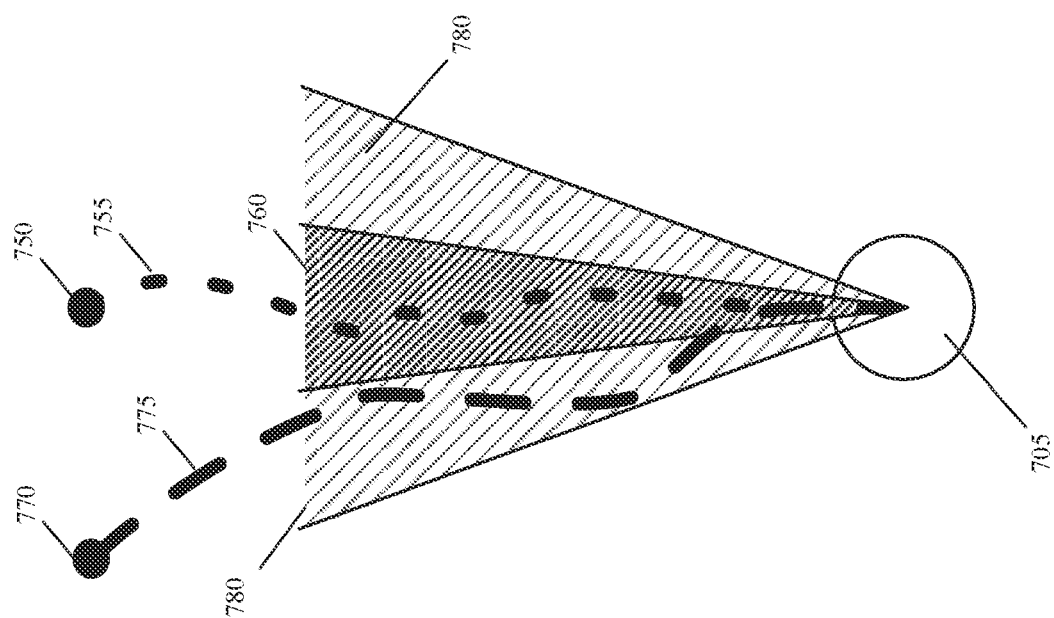
FIG. 7 illustrates examples of constraints that some embodiments define to define how much a puck can rotate on the map while it travels on windy roads.

Some embodiments put some constraints on how much the puck can rotate on the map while it travels on windy roads (e.g., windy highways.). FIG. 7 illustrates some of these constraints. This figure shows that, in some of these embodiments, when an upcoming location 750 along a route 755 falls within a first, inner angular range 760 of an orientation of a puck 705, the VC engine rotates the camera with the puck (i.e., has the virtual camera point in the same direction as the puck 705), which prevents the puck from appearing to rotate. However, when the upcoming location 770 along a route 775 falls within a second, outer angular range 780 of the puck's orientation, the VC engine maintains the virtual camera pointed on the upcoming location, which allows the puck to rotate independently of the map as it travels along the route. When the point falls outside of the second angular range 780, the VC engine in some embodiments rotates the virtual camera towards the puck in order to bring the puck back to alignment with the camera.

In some embodiments, the VC engine uses the angular range approach illustrated in FIG. 7 while the puck travels along a highway or a freeway. In some of these embodiments, the VC engine uses different ranges of angles when the puck travels along a highway than it uses when the puck travels along a freeway. For instance, in some embodiments, the VC engine uses smaller ranges of angles while the device travels along a highway, than when the puck travels along a freeway.

The VC engine 120 in some embodiments operates the virtual camera 125 in a framing mode when the puck is reaching a freeway and/or highway exit that is used by a maneuver along the navigated route. For instance, in some embodiments, the virtual camera starts to frame the puck and the exit used by a maneuver, as the puck is within a threshold distance of the exit. As the puck gets closer to this exit, the virtual camera in some of these embodiments zooms in to try to maintain the puck and exit within the same relative region of interest on the display screen. In some embodiments, the virtual camera performs this framing operation from a perspective 3D point of view (e.g., a high zoom 3D point of view), while in other embodiments, the virtual camera performs this framing operation from a top-down 2D point of view.

Figure 8:
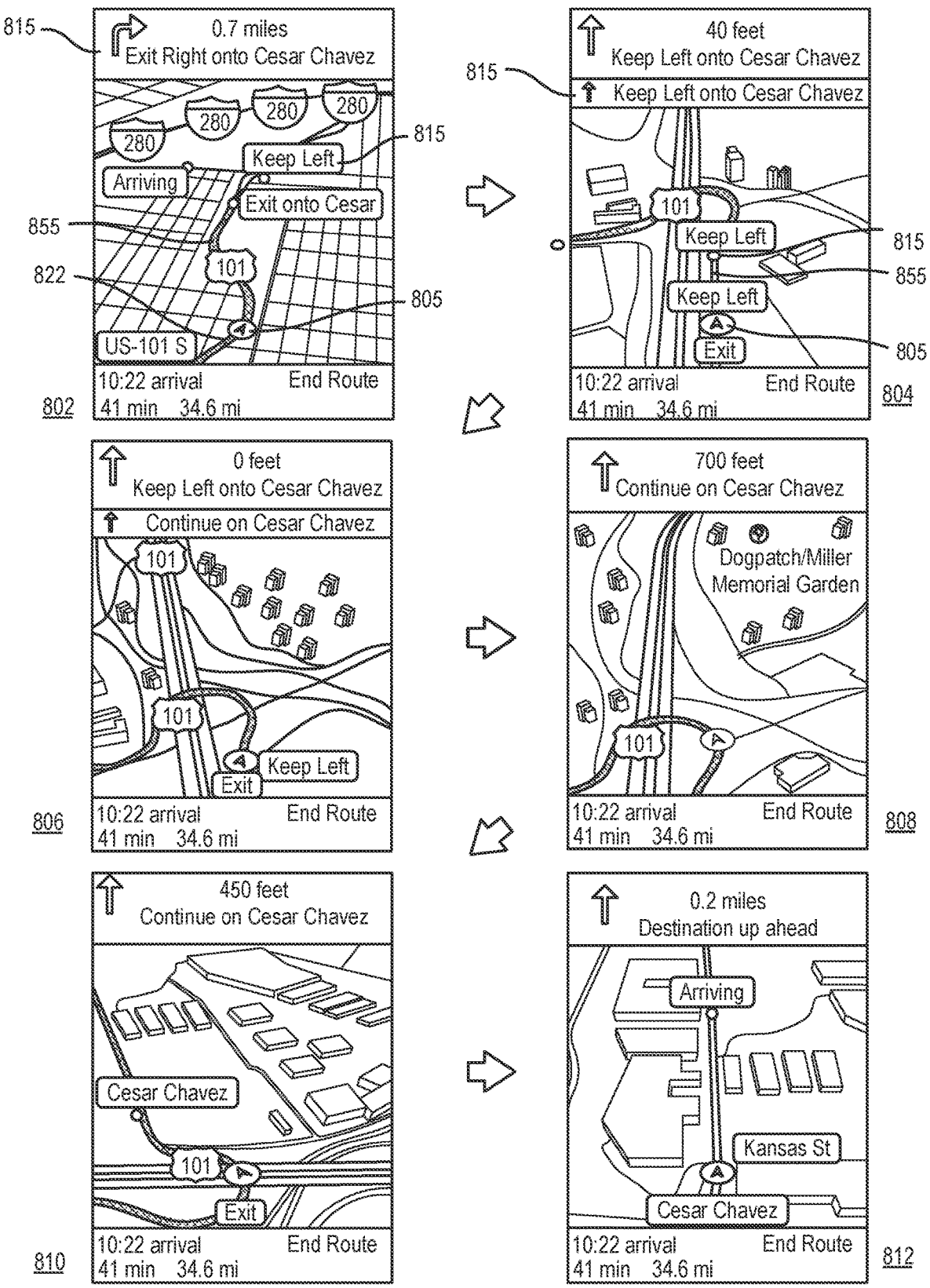
FIG. 8 presents an example that illustrates the framing of a freeway exit at which a puck has to make a maneuver to exit a freeway that is on a navigated route.

FIG. 8 presents an example that illustrates the framing of a freeway exit 815 at which a puck 805 has to make a maneuver to exit a freeway 822 that is on a navigated route 855. This example is presented in six navigation scenes 802, 804, 806, 808, 810, and 812 of the navigation presentation. The first scene 802 shows the puck traveling on the freeway 822 from a high perspective 3D view of the camera. The top of this scene shows the exit 815 that the puck has to take at a distant location that is currently very far from the puck.

The second scene 804 shows that as the puck gets closer to the exit 815, the navigation presentation shows a closer perspective 3D view of the map, the puck 805 and the navigated route 855. This view is generated by lowering the virtual camera's zoom level (i.e., reducing the height of the virtual camera) so that the virtual camera can be closer to the map. In some embodiments, the VC engine brings the virtual camera to a lower zoom level so that it can then have the virtual camera start framing the puck 805 and the exit 815.

The third, fourth, and fifth scene 806-810 are three navigation scenes that navigation application renders after the virtual camera starts to frame the puck and the exit. In some embodiments, the virtual camera frames the puck and several locations on the exit ramp ahead of the puck. Each exit in some embodiments has a set of points that define a ramp or road segment(s) associated with the exit. In some embodiments, the virtual camera includes the exit's associated set of points in the collection of points that it uses to define frames for a puck exiting a highway or freeway. In the example of FIG. 8, the exit ramp is used to define the topside of several frames defined during this framing operation. During this framing operation, the puck's origin and angular orientation can differ than those of the virtual camera. As such, the puck can appear to rotate on the map and to move up or down on the screen, as shown in the third, fourth, and fifth scene 806-810.

The sixth scene 812 shows the navigation presentation after the puck has gotten off the exit's ramp and has reached an urban street that leads to the route's destination. In this scene, the virtual camera has moved to a lower perspective 3D view. Also, at this stage, the virtual camera has switched from operating in its framing mode to operating in its tracking mode. In this tracking mode, the virtual camera maintains its origin offset (e.g., zero offset) with the puck's origin and aligns its angular orientation with that of the puck, until the puck gets closer to the destination.

At times, one exit has multiple ramps that connect to different streets or to different directions of travel along the same street. In such situations, the navigation application of some embodiments displays the ramp that is used by the route maneuver differently than the other nearby ramps. To help differentiate this ramp from the other nearby ramps, the VC engine of some embodiments has the virtual camera frame this ramp along with the puck and one or more of the other nearby ramps. This framing allows the user to clearly view the ramp that needs to be used in the context of other nearby ramps. The VC engine in some embodiments has the virtual camera frame the relevant ramp along with a maximum number N (e.g., 2) of other nearby ramps.

In some embodiments, the VC engine 120 receives a VC style (i.e., the set of VC properties) that specifies several framing parameters for directing the VC engine on how to have the virtual camera frame the puck as it travels along an exit freeway ramp. Examples of such framing parameters include the 3D perspective view (e.g., a view with a particular pitch) of the virtual camera, the size of the puck's bounding box, and/or a specification that upcoming locations along the exit ramp have to be framed. In some embodiments, the received VC style does not specify some of these parameters, and/or specifies other framing parameters.

Figure 9:
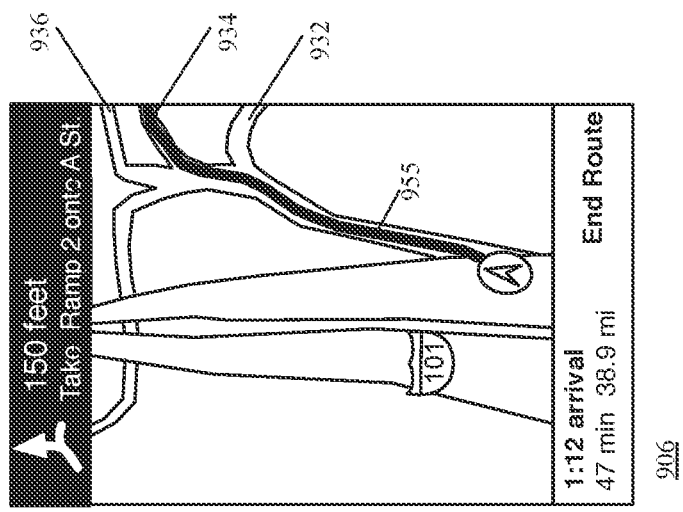
FIG. 9 presents an example that illustrates the framing of several ramps associated with one freeway exit that has one ramp that a puck has to use to exit a navigated freeway.
Figure 9:
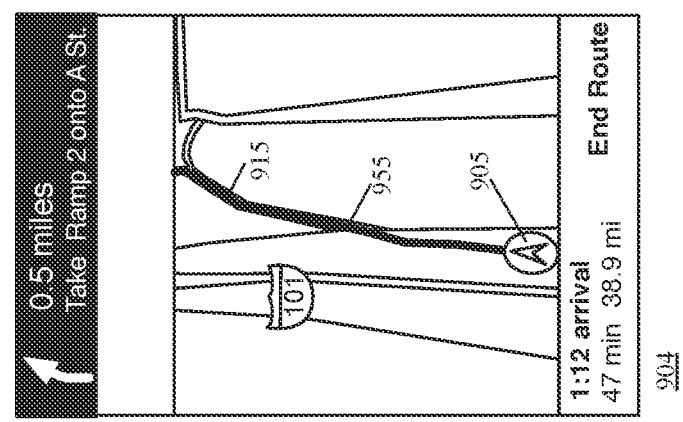
Figure 9:
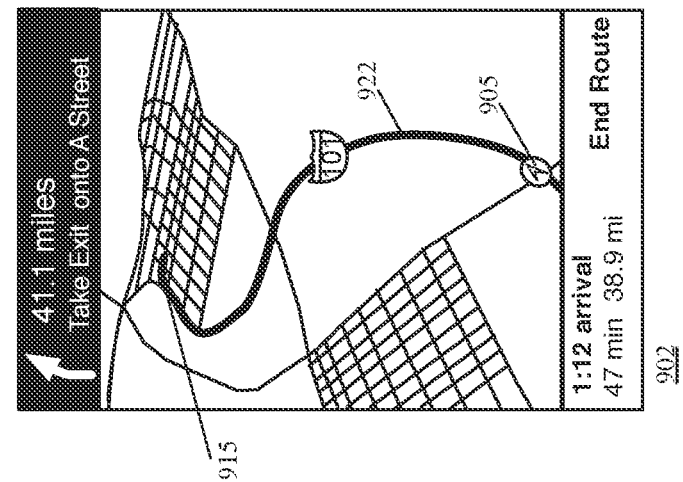

FIG. 9 presents an example that illustrates the framing of several ramps associated with one freeway exit that has one ramp that a puck 905 has to use to exit a navigated freeway. This example is presented by reference to three navigation scenes 902, 904, and 906 of the navigation presentation. The first scene 902 shows the puck traveling on the freeway 922 from a high perspective 3D view of the camera. The top of this scene shows the exit 915 that the puck has to take at a distant location that is currently very far from the puck.

The second scene 904 shows that as the puck gets closer to the exit 915, the navigation presentation shows a closer perspective 3D view of the map, the puck 905 and the navigated route 955. This view is generated by lowering the virtual camera's zoom level so that the virtual camera can be closer to the map. In some embodiments, the VC engine lowers the virtual camera's height so that it can then have the virtual camera start framing the puck 905 and the exit 915.

The second scene 904 also starts to show that the exit 915 has multiple ramps 932, 934, and 936 that connect to multiple different streets near the exit. To more clearly show the exit ramp 934 that the puck has to use to perform its maneuver, and to more clearly differentiate this ramp from other nearby ramps, the VC engine has the virtual camera move to a closer 3D perspective view of the ramps 932-936 and frame the puck along with several locations along these ramps, as shown in the third scene 906. In some embodiments, the ramp locations that are used for the framing are all of the locations along the ramp, or a subset of locations on the ramp that are predefined or are on-the-fly generated by the VC engine. In some embodiments, VC engine has the virtual camera frame the ramps 932-936 from a top-down 2D view instead of the 3D perspective view shown in the third scene 906.

In the example illustrated in FIG. 9, the ramp 934 is differentiated from the other two ramps 932 and 936 just by virtue of showing the route 955 using this ramp 934. Other embodiments further differentiate this ramp from the other ramps by highlighting or changing the color of this ramp 934 from that of the other two ramps 932 and 936, or through some other mechanism. As the puck performs its maneuver along the ramp 934 and reaches the end of this ramp, the VC engine in this example directs the virtual camera to switch from operating in its framing mode to operating in its tracking mode, so that it can track the puck as it travels along the urban street network to reach its destination. While the puck navigates the urban street network, the VC engine can switch to operate the virtual camera in its framing mode when the navigation context changes and this change necessitates operating the camera in this mode.

The VC engine of some embodiments has the virtual camera frame a group of upcoming maneuvers along the navigated route when these maneuvers meet a set of grouping criteria. Based on the grouping criteria, the method of some embodiments dynamically identifies groups of upcoming maneuvers for the navigation presentation (e.g., the method does not require these maneuvers to be statically grouped before the navigated route is identified). By framing the group of upcoming maneuvers, the virtual camera can produce a navigation presentation that displays several upcoming maneuvers that are near each other, in order to highlight one or more maneuvers that follow the next maneuver in the route. For this framing, the puck can appear at offset locations and rotate independently of the map (i.e., of the virtual camera). In some embodiments, the set of ramps associated with an exit (such as ramps 932-936) are treated as a grouped set of maneuvers.

In some embodiments, the VC engine 120 receives a VC style (i.e., the set of VC properties) that specifies several framing parameters for directing the VC engine on how to have the virtual camera frame the puck as it reaches a freeway exit with multiple grouped ramps. Examples of such framing parameters include the 3D perspective view (e.g., a view with a particular pitch) of the virtual camera, the size of the puck's bounding box, and/or the maximum number of grouped ramps to frame. In some embodiments, the received VC style does not specify some of these parameters, and/or specifies other framing parameters.

Different embodiments use different criteria for grouping maneuvers. In some embodiments, the grouping criteria relates to the category associated with the maneuver and to the distance between the maneuver and other nearby adjacent maneuvers. Two categories of maneuvers that are used to group maneuvers in some embodiments are (1) whether the maneuver is part of a set of maneuvers associated with a roundabout, and (2) whether the maneuver is along an exit ramp. When a particular maneuver is part of a group of maneuvers and the particular maneuver has to be framed, the VC engine has the virtual camera frame the entire group of maneuvers. Also, a large number of maneuvers might belong to one group. Framing a large group of maneuvers might provide too much detail to the user and thereby confuse the user. Hence, some embodiments limit the number of maneuvers that are framed in any one group (e.g., have the virtual camera frame at most five maneuvers in a group).

Figure 10:
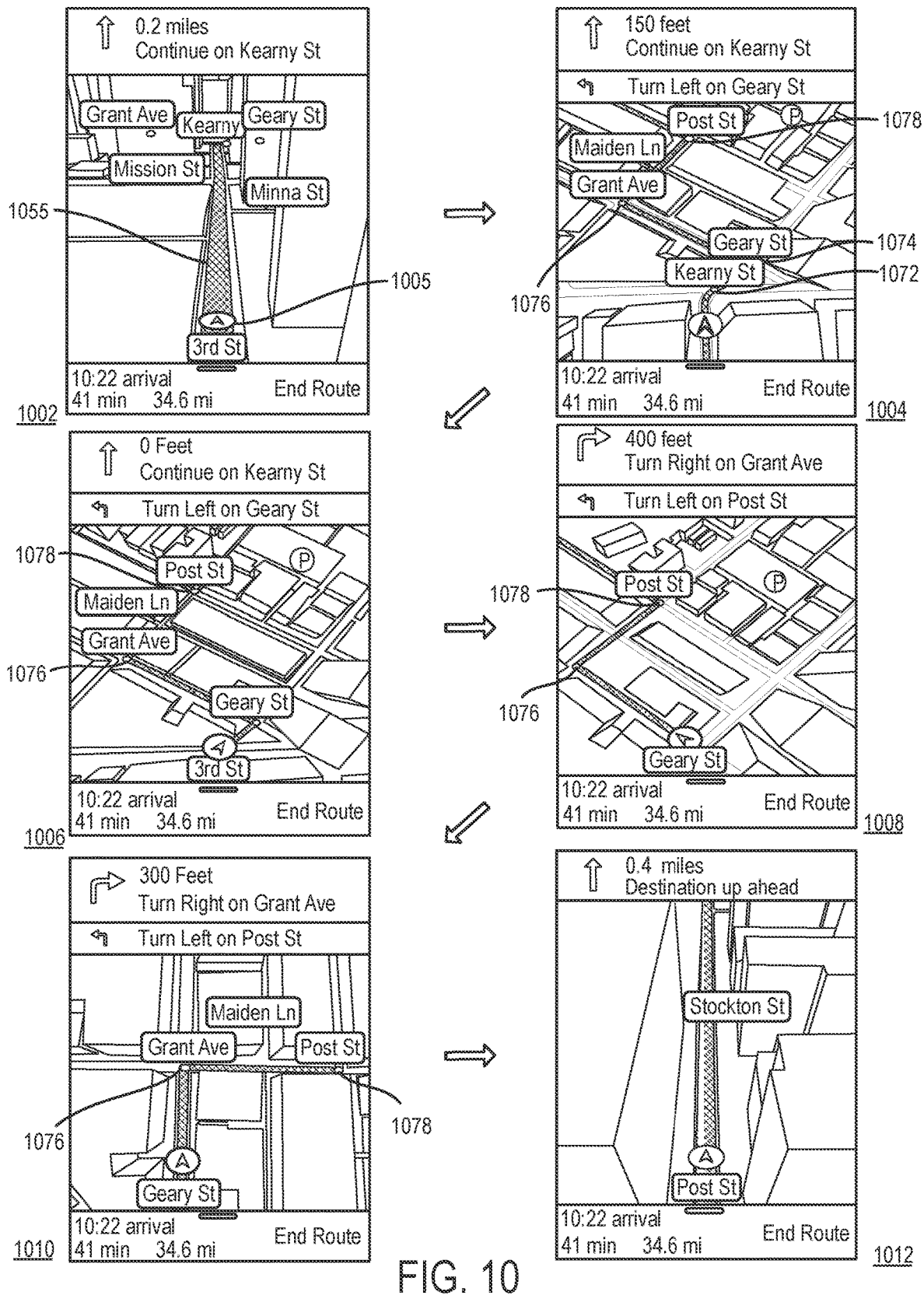
FIG. 10 presents one example that illustrates the grouping of upcoming maneuvers and the framing of the maneuvers in a group.

FIG. 10 presents one example that illustrates the grouping of upcoming maneuvers and the framing of the maneuvers in a group. This example illustrates several maneuvers that are grouped because of their close proximity to each other. In this example, a puck 1005 travels along a route 1055 that uses several city streets. This example is presented in six navigation scenes 1002, 1004, 1006, 1008, 1010, and 1012 of the navigation presentation.

The first scene 1002 shows the puck 1005 traveling on the road from a low perspective 3D view of the virtual camera while this camera is operating in the tracking mode. The top of this scene shows a right turn that the puck has to make at a distant location. Three other maneuvers are near this right turn. Thus, as the puck gets closer to the right turn at the end of the road, the VC engine switches from operating the virtual camera in its tracking mode to operating it in its framing mode so that it can frame the group of upcoming maneuvers.

To group these maneuvers, the VC engine 120 first moves the virtual camera to a higher zoom level so that it can have an unobstructed view of the maneuvers in the group. The second scene 1004 shows the grouped upcoming maneuvers from such higher zoom level. As shown in this scene, the grouped maneuvers in this example include a first right turn 1072, followed by a first left turn 1074, followed by a second right turn 1076, and then a second left turn 1078. In this example, the grouped maneuvers are shown from top-down 2D view of the virtual camera. In other embodiments, the VC engine directs the virtual camera to show this grouped set of maneuvers (and other grouped maneuvers) from a perspective 3D position.

The third and fourth scenes 1006 and 1008 are two navigation scenes that navigation application renders after the virtual camera starts to frame the puck and the grouped maneuvers 1074-1078 (not the maneuver 1072 as the puck has moved past this maneuver). To perform this framing, the VC engine uses the locations of the maneuvers 1074-1078 along with the puck to define the boundaries of the frame. Also, in some embodiments, the VC engine 120 directs the virtual camera to point towards the last maneuver 1078 in the group of maneuvers while it is framing the puck and the group of maneuvers. During this framing operation, the puck's origin and angular orientation can differ from those of the virtual camera. As such, the puck can appear to rotate on the map and to move up or down on the screen. The rotation of the puck on the map is shown in the third and fourth scene 1006 and 1008.

As the puck passes each maneuver in the group, the VC engine removes the maneuver from the group of maneuvers that the virtual camera has to frame either immediately or a threshold distance after the puck moves past the maneuver. As such, the virtual camera's framing of the group of maneuvers often changes as the puck passes each maneuver in the group. This is most clearly illustrated in the change between the fourth and fifth scenes 1008 and 1010. While the fourth scene 1008 shows the grouped maneuvers 1074-1078 being framed along with the puck, the fifth scene 1010 shows the grouped maneuvers 1076 and 1078 being framed with the puck. In the fifth scene 1010, the virtual camera operates at a lower zoom level to show more of the maneuvers 1076 and 1078 in the frames that it defies. Also, in the fifth scene 1010, the virtual camera's angular orientation happens to be aligned with the puck but its origin is offset from that of the virtual camera so that it can provide a full view of both upcoming grouped maneuvers 1076 and 1078.

The sixth scene 1012 shows the navigation presentation after the puck has moved past the last grouped maneuver 1078. In this scene, the virtual camera has moved to a lower perspective 3D view. Also, at this stage, the virtual camera has switched from operating in its framing mode to operating in its tracking mode. In this tracking mode, the virtual camera's maintains its origin offset (e.g., zero offset) with the puck's origin and aligns its angular orientation with that of the puck, until the puck gets closer to the destination.

In some embodiments, the VC engine 120 receives a VC style (i.e., the set of VC properties) that specifies several framing parameters for directing the VC engine on how to have the virtual camera frame the puck and a group of upcoming maneuvers. Examples of such framing parameters include the 2D top-down view of the virtual camera, the size of the puck's bounding box, the orientation of the virtual camera toward the last maneuver in the group, and/or the maximum number of maneuvers in the group to frame at any one time. In some embodiments, the received VC style does not specify some of these parameters, and/or specifies other framing parameters. Also, in some embodiments, the VC engine receives the identity of each group of maneuvers and their associated locations from the navigation module 105.

Figure 11:
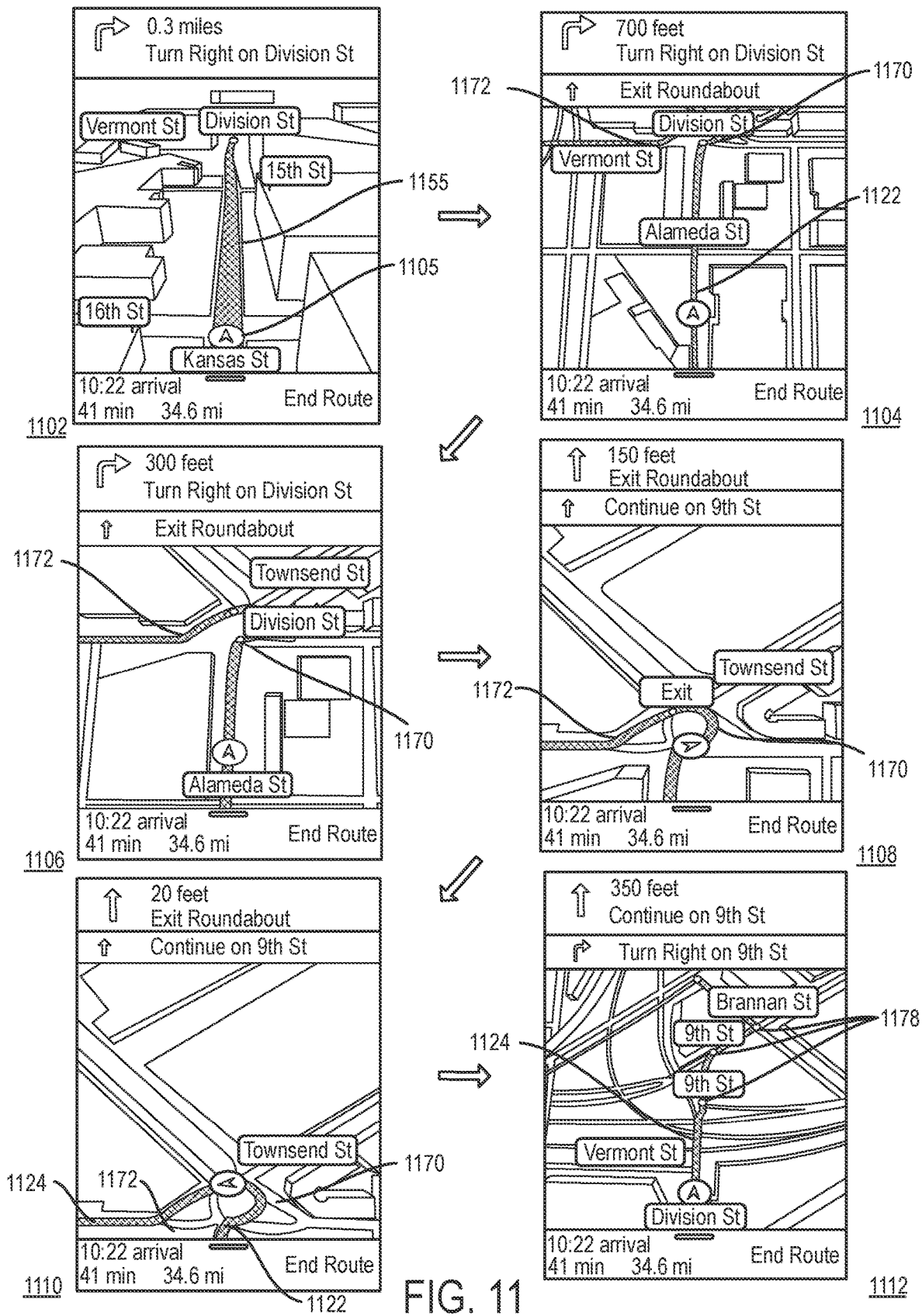
FIG. 11 presents another example that illustrates the grouping of upcoming maneuvers and the framing of the maneuvers in a group.

FIG. 11 presents another example that illustrates the grouping of upcoming maneuvers and the framing of the maneuvers in a group. This example illustrates two set of grouped maneuvers. The first set of grouped maneuvers includes maneuvers that are associated with a roundabout, while the second set of grouped maneuvers includes maneuvers that are grouped because of their close proximity to each other. In this example, a puck 1105 travels along a route 1155 that uses several city streets. This example is presented in six navigation scenes 1102, 1104, 1106, 1108, 1110, and 1112 of the navigation presentation.

The first scene 1102 shows the puck 1105 traveling on the road from a low perspective 3D view of the virtual camera while this camera is operating in the tracking mode. The top of this scene shows a street named "Division," which is identified in the navigation banner as a street on which the puck will have to make a right turn. The second scene 1104 shows that this right turn puts the puck on a roundabout 1170 that connects to multiple streets. As the puck gets closer to the right turn at the end of the road 1122, the VC engine switches from operating the virtual camera in its tracking mode to operating it in its framing mode so that it can frame the roundabout 1170.

To group this roundabout, the VC engine 120 first moves the virtual camera to a higher zoom level so that it can have an unobstructed view of roundabout. The second scene 1104 shows the roundabout from such higher zoom level. The third scene 1106 shows this roundabout from a lower zoom level that the virtual camera reaches so that it can start to frame the puck and roundabout in such a way that they fit the desired region of interest on the display screen. As shown in the second and third scenes 1104 and 1106, the roundabout 1170 in this includes an exit 1172 that the puck needs to make to get off this roundabout. The roundabout 1170 also is defined by reference to a set of locations that VC engine has the virtual camera frame along with the puck. These locations are locations on the roundabout ahead of the puck. In this example, the virtual camera frames this roundabout 1170 from a top-down 2D position. In other embodiments, the VC engine directs the virtual camera to show this roundabout from perspective 3D position.

The fourth and fifth scenes 1108 and 1110 are two navigation scenes that navigation application renders after the virtual camera starts to frame the puck and the roundabout 1170. In these scenes, the puck has reached the roundabout and going around to reach the exit 1172. In some embodiments, the VC engine 120 has the virtual camera point towards the top of the roundabout from the perspective of the road 1122 that the puck navigated to reach the roundabout. This framing approach does not change as the puck maneuvers on the roundabout past streets that it does not use. As such, this framing of the roundabout shows the puck moving along the roundabout and rotating as it moves. The rotation of the puck on the map is shown in the fourth and fifth scene 1108 and 1110.

Once the puck passes the roundabout exit 1172 and gets on the street 1124, the VC engine no longer has the virtual camera frame the roundabout 1170 as it is now behind the puck. Typically, the VC engine would have the virtual camera resume its tracking behavior, but in this example, a short distance after the puck gets on street 1124, the puck will reach a set of maneuvers that are near each other and hence have been grouped. As such, the VC engine 120 has the virtual camera go from framing the roundabout 1170 to the grouped set of maneuvers 1178, as shown in the sixth scene 1112.

Figure 12:
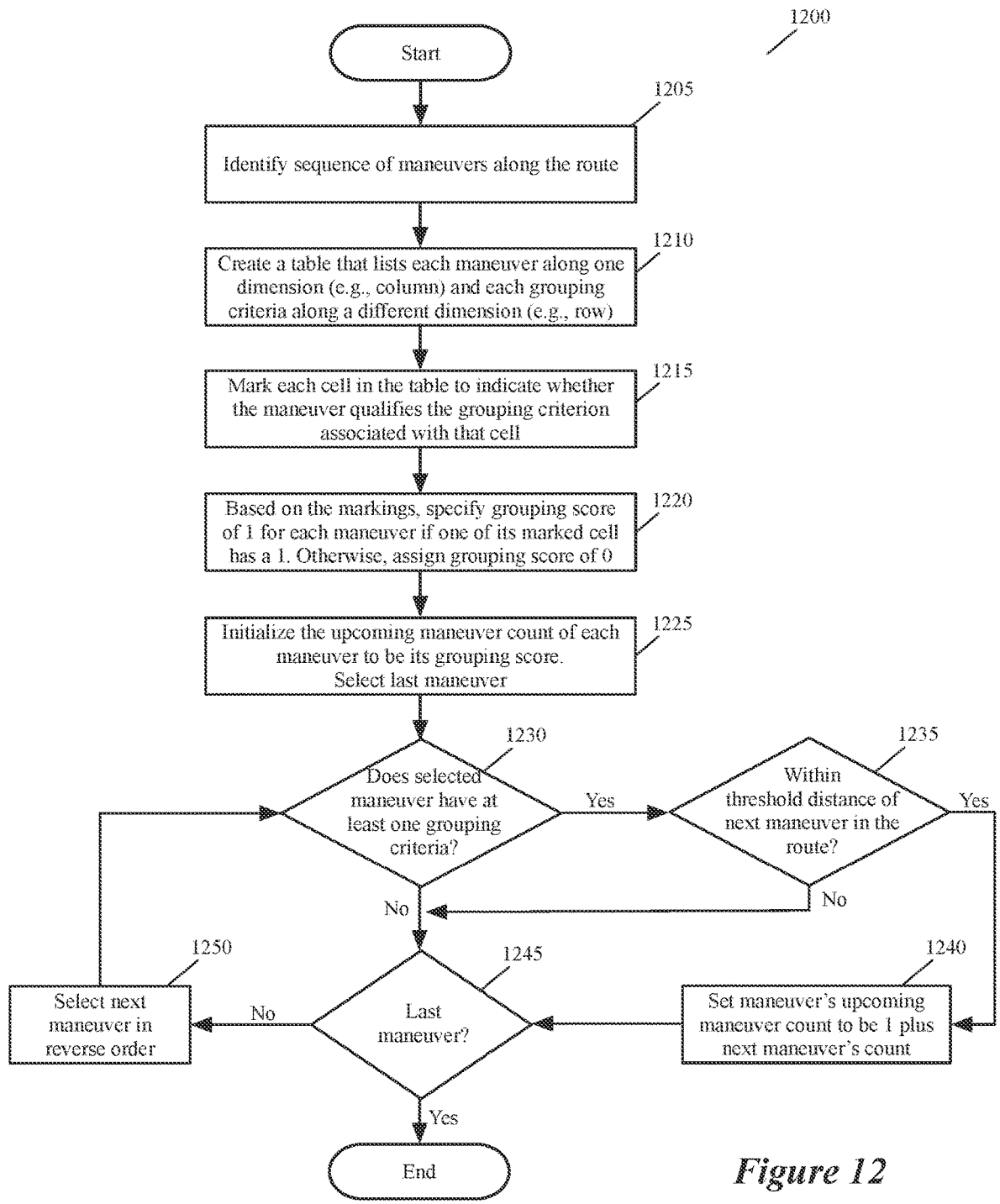
FIG. 12 illustrates a process that the navigation module performs in some embodiments to dynamically identify group or groups of maneuvers for a route.

In some embodiments, the navigation application dynamically defines the set or sets of maneuvers to group in a route. FIG. 12 illustrates a process that the navigation module 105 performs in some embodiments to dynamically identify group or groups of maneuvers for a route. This process is dynamic because whenever the route changes, the navigation module 105 re-performs this process to determine whether it contains two or more maneuvers that should be grouped together. Any new groups it identifies might overlap with the groups identified for a prior route or might be completely different from these previously identified groups.

To dynamically group the maneuvers, the navigation module 105 accounts for the order of the maneuvers, their distance from each other, and their type. The navigation module in some embodiments (1) sorts the maneuvers according to their order in the route, (2) assigns a score of 1 to each maneuver that satisfies at least one grouping criterion and a score of 0 to each maneuver that does not satisfy any grouping criterion, and (3) steps backwards through the maneuvers to generate a maneuver count for each particular maneuver by adding the maneuver count of the previous maneuver in the backward traversal (i.e., the count of the next maneuver in the route) to the particular maneuver's count so long as the particular maneuver is within a threshold distance of the previous maneuver in the backward traversal.

As shown, the process 1200 starts (at 1205) by identifying a sequence of maneuvers along the route, as well as the location and type of each identified maneuver. In some embodiments, the process 1200 identifies the maneuver sequence and the maneuver locations and types based on the route definition that it receives from a route-identifying module of the navigation application. The route-identifying module obtains some or all of this information from a remote set of servers in some embodiments.

Figure 13:
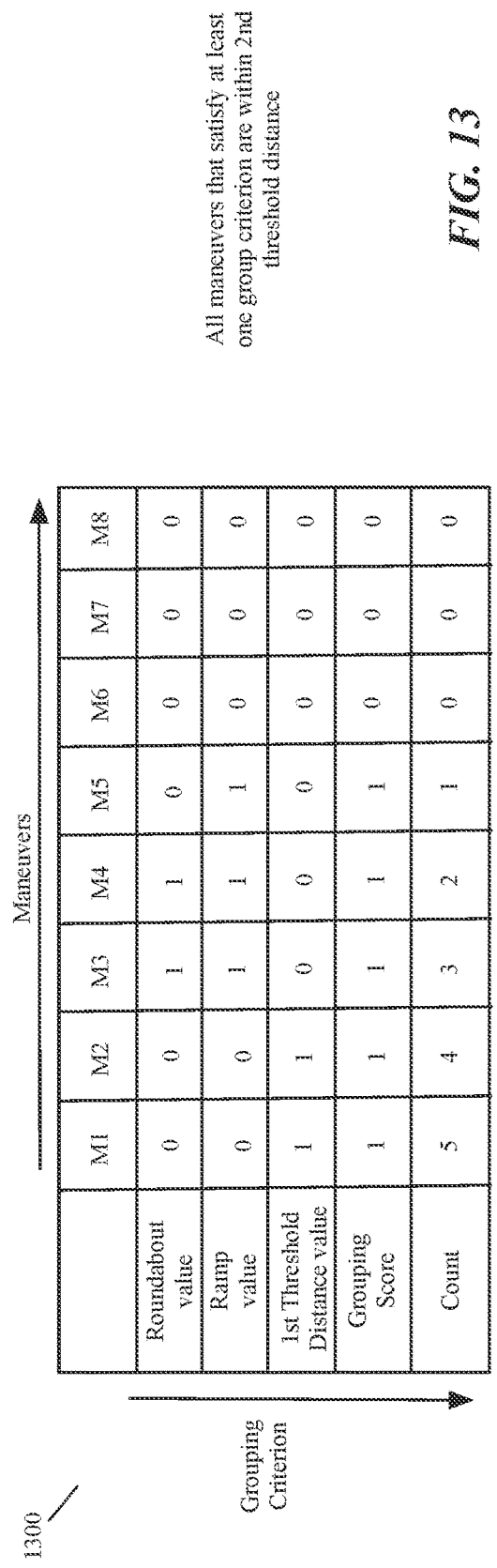
FIG. 13 illustrates one example of a table that lists each maneuver along one dimension and each grouping criterion along another dimension.

Next, at 1210, the process creates a table that lists each maneuver along one dimension and each grouping criterion along another dimension. FIG. 13 illustrates one example of such a table 1300. In this table, the maneuvers are listed along the table's columns, while the grouping criteria are listed along the table's rows. Also, in this example, the route has eight maneuvers M1-M8, and the process uses three grouping criteria, two of which are based on the maneuver type and one is based on a distance threshold. Specifically, the first grouping criterion is whether the maneuver is associated with a roundabout, the second grouping criterion is whether the maneuver is associated with an exit ramp, and the third grouping criterion is whether the maneuver is within a first threshold distance (e.g., 100 meters) of at least one other maneuver in the route. Other embodiments use other sets of grouping criteria, e.g., might use other criteria in addition to the three mentioned above or might not use some or all of the three mentioned above.

After creating the table, the process 1200 assigns (at 1215) (1) a grouping value of 1 in each maneuver's cell for each grouping criterion when that maneuver satisfies the grouping criterion, and (2) a grouping value of 0 in each maneuver's cell for each grouping criterion when that maneuver does not satisfy the grouping criterion. In FIG. 13, the third and fourth maneuvers M3 and M4 are designated by a value of 1 as being associated with roundabouts, the third through fifth maneuvers M3-M5 are designated by a value of 1 as being associated with a ramp, and the first and second maneuvers M1 and M2 are specified by a value of 1 as being within a first threshold distance of another maneuver. All other cells in the first three non-header rows are assigned a value of 0 as each such cell's associated maneuver does not satisfy the cell's associated grouping criterion.

Next, at 1220, the process computes a grouping score of 1 or 0 for each maneuver, by assigning (1) a grouping score of 1 to the maneuver when the maneuver has at least one grouping value of 1, and (2) a grouping score of 0 to the maneuver when the maneuver has no grouping value of 1. Essentially, for each maneuver, this operation OR's the grouping values of the maneuver to produce the grouping score for the maneuver. FIG. 13 shows that the operation 1220 for the maneuvers in this example generates a grouping score of 1 for the first five maneuvers M1-M5, and a grouping score of 0 for the last three maneuvers M6-M8.

At 1225, the process 1200 in some embodiments generates an initial maneuver count for each maneuver by setting this count equal to maneuver's grouping score. The process also selects (at 1225) the last maneuver in the route as the current maneuver, so that it can start its backwards traversal through the route in order to compute an upcoming maneuver count for each maneuver. In FIG. 13, this maneuver is maneuver M8. Next, at 1230, the process determines whether the selected maneuver has a grouping score of 1 (i.e., whether it is associated with at least one grouping criterion). If not, the process transitions to 1245, which will be described below.

Otherwise, the process determines (at 1235) whether the selected maneuver is within a second threshold distance (e.g., 500 meters) of the next maneuver in the route, which was the previous maneuver that the process 1200 examined in its backward traversal through the route. This second threshold value is meant to allow the virtual camera to continue operating in its framing mode when going from framing one group of maneuvers to framing another group of maneuvers, as described above by reference to FIG. 11. For the first examined maneuver (which is the last maneuver in the route), this answer is obviously no as there are no subsequent maneuvers in the route.

When the process determines (at 1235) that the selected maneuver is not within the second threshold distance of the next maneuver on the route, the process transitions to 1245, which will be described below. Otherwise, when the selected maneuver is within the second threshold distance of next maneuver on the route, the process computes (at 1240) an upcoming maneuver count of the selected maneuver as 1 plus the maneuver count of the next maneuver on the route (i.e., 1 plus the maneuver count of the maneuver that the process selected previously at 1225 or 1250). After 1240, the process transitions to 1245.

At 1245, the process determines whether it has examined all the maneuvers in its backward traversal through the maneuvers in the route. If so, it ends. Otherwise, the process selects (at 1250) the next maneuver in its backward traversal (i.e., selects the maneuver that, in the route, is before the currently selected maneuver). For instance, after computing the maneuver count for the fifth maneuver in the route by performing a subset of the operations 1230-1245, the process 1200 selects the fourth maneuver in the route so that it can perform a subset of the operations 1230-1245 to compute its maneuver count based on the count of the fifth maneuver.

Figure 14:
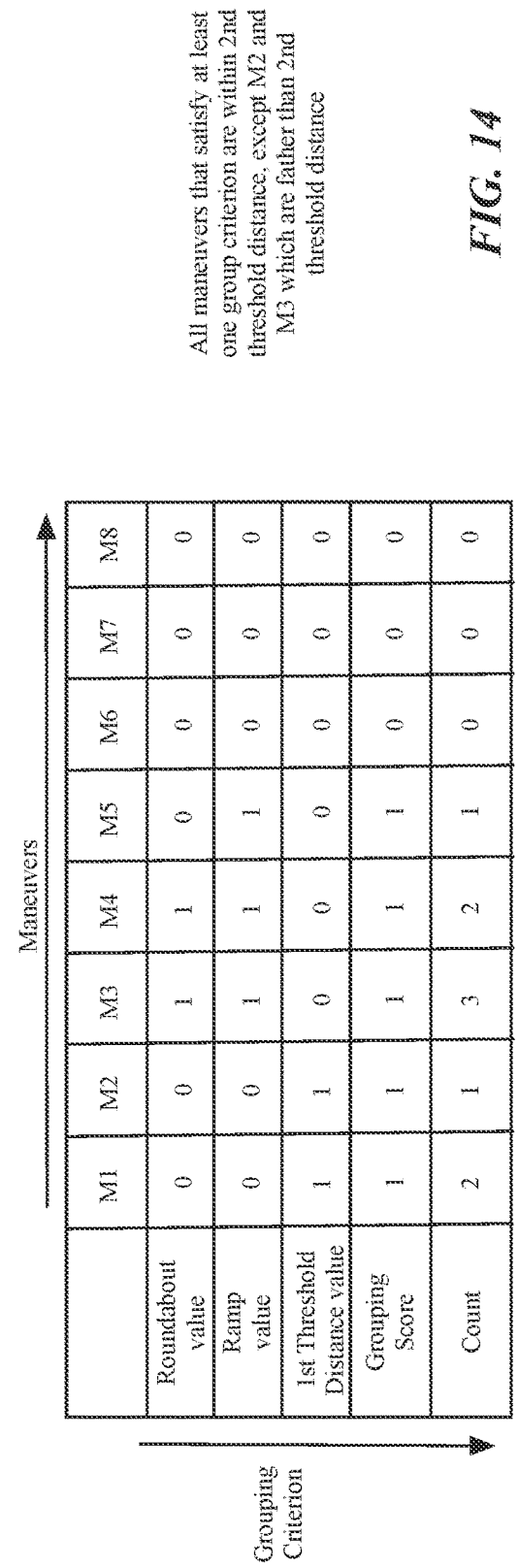
FIG. 14 shows an identical example to that of FIG. 13, except that in the example of FIG. 14, a second maneuver is not within the second threshold distance of the third maneuver.

FIG. 13 shows the computed maneuver counts in its last row. In this example, each of the first four maneuvers M1-M4 is assumed to be within the second distance threshold of the next maneuver in the route. FIG. 14 shows an identical example to that of FIG. 13, except that in the example of FIG. 14, the second maneuver M2 is not within the second threshold distance of the third maneuver M3. Because of this, the maneuver count of the second maneuver M2 remains at 1 (i.e., is not incremented by maneuver count of the third maneuver M3). As such, the maneuver counts of the first and second maneuvers M1 and M2 in FIG. 14 end up being different than the counts for these maneuvers in FIG. 13.

As described above, the virtual camera and the puck not only can be horizontally offset from each other, but also can be vertically offset from each other in some embodiments. This vertical offset can make the puck move up or down the screen during the navigation presentation (i.e., can make the puck be at different vertical positions on the screen at different instances in the navigation presentation). Having the puck move up the screen is useful when the puck has to make a U-turn, because this would allow the virtual camera to capture more of the route after the turn. For U-turns, the VC engine in some embodiments not only allows the puck to move up the screen, but also require the puck to be at the top of the frame captured by the virtual camera, as opposed to other framing operations that just require the puck to be one of the points within the frame.

Figure 15:
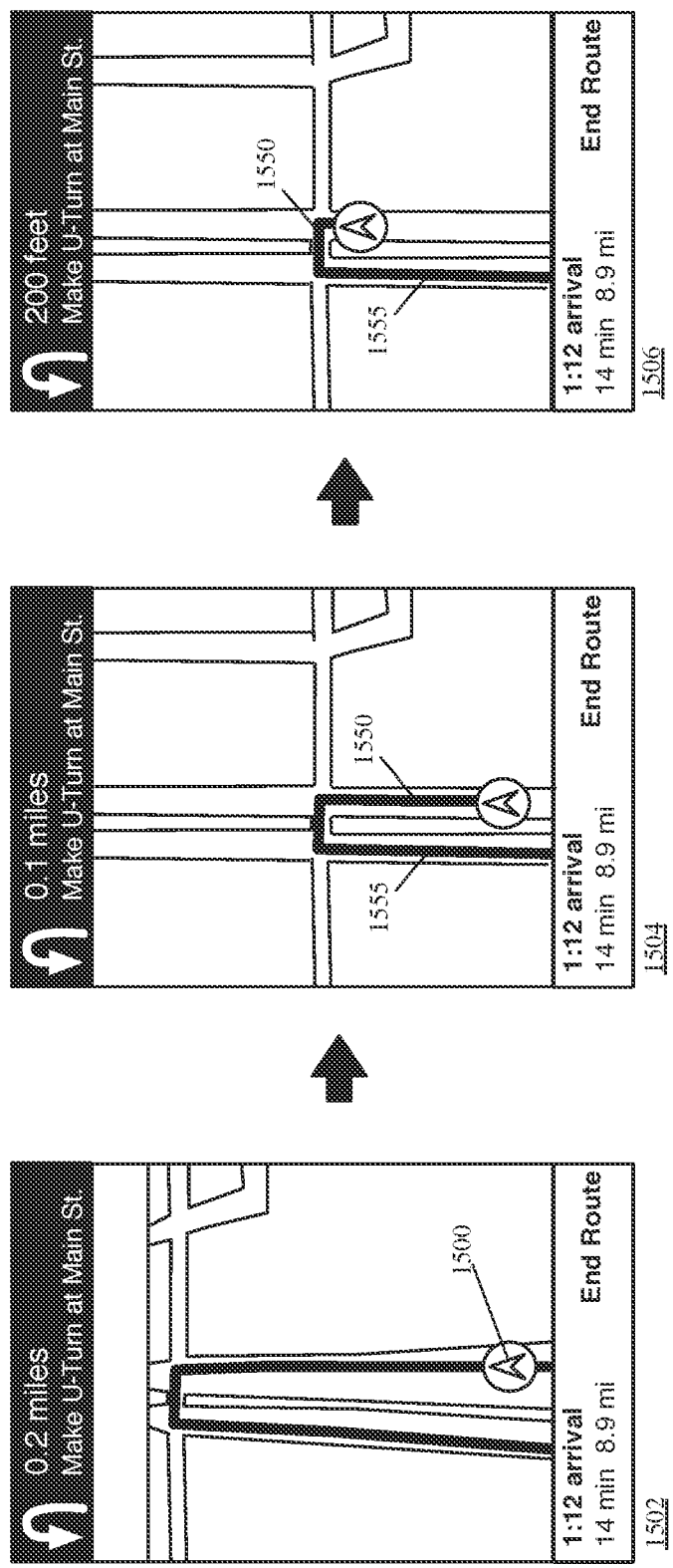
FIG. 15 illustrates an example of a puck approaching a U-turn in some embodiments.

FIG. 15 illustrates an example of a puck 1500 approaching a U-turn in some embodiments. This example is illustrated in three scenes 1502-1506. The first scene 1502 shows the puck from a vantage point of a virtual camera that operates in a 3D perspective view. When the puck is within a threshold distance of the location of the U-turn, the VC engine 120 has the virtual camera start to frame the puck and the location of the U-turn so that the captured view not only shows the portion 1550 of the road ahead to the location of the U-turn, but also shows the portion 1555 of the road after the U-turn. In some embodiments, the VC engine has the virtual camera perform this framing from a top-down 2D view, as shown in the second and third stages 1504 and 1506. This framing in some embodiments causes the virtual camera to define a sequence of navigation scenes in which the map does not move vertically or does not have much vertical movement, while the puck moves vertically towards the location of the U-turn. In some embodiments, this framing positions the location of the U-turn at the center of the navigation presentation's display area, or near this center. Some of these embodiments then show the puck moving towards this central location, before starting to make its U-turn.

In some embodiments, the VC engine 120 receives a VC style (i.e., the set of VC properties) that specifies several framing parameters for directing the VC engine on how to have the virtual camera frame the puck as it reaches a U-turn. Examples of such framing parameters include the 2D top-down view of the virtual camera, the size of the puck's bounding box, the requirement that the puck is placed at the top of the puck's bounding box, and/or the amount of the route after the U-turn for framing. In some embodiments, the received VC style does not specify some of these parameters, and/or specifies other framing parameters.

Figure 16:
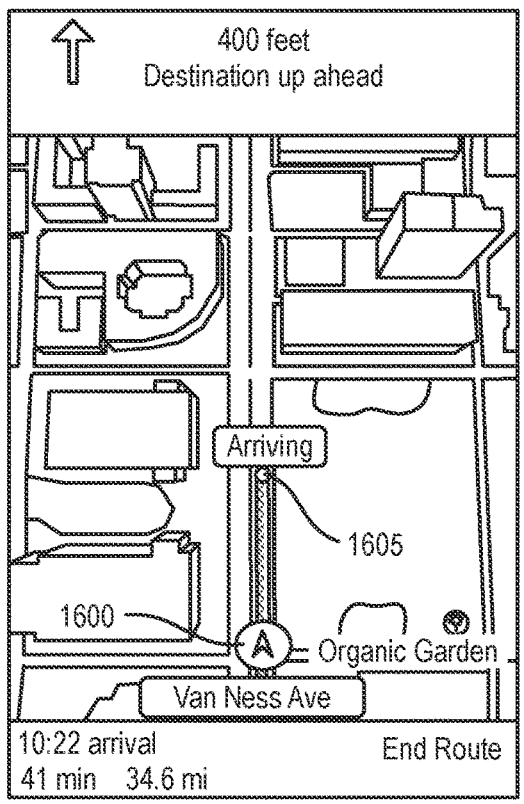
FIG. 16 illustrates an example of framing a puck and an arrival point after the puck passes the arrival point.
Figure 16:
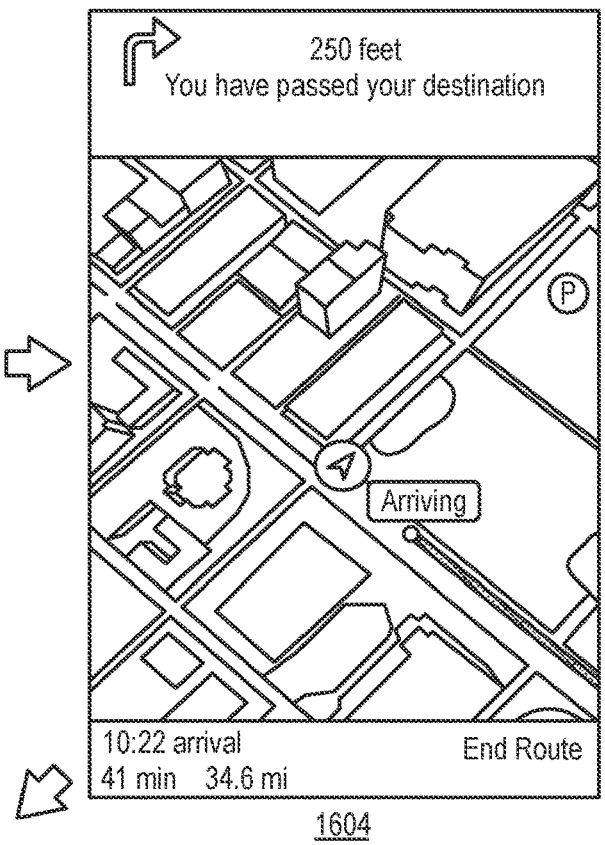
Figure 16:
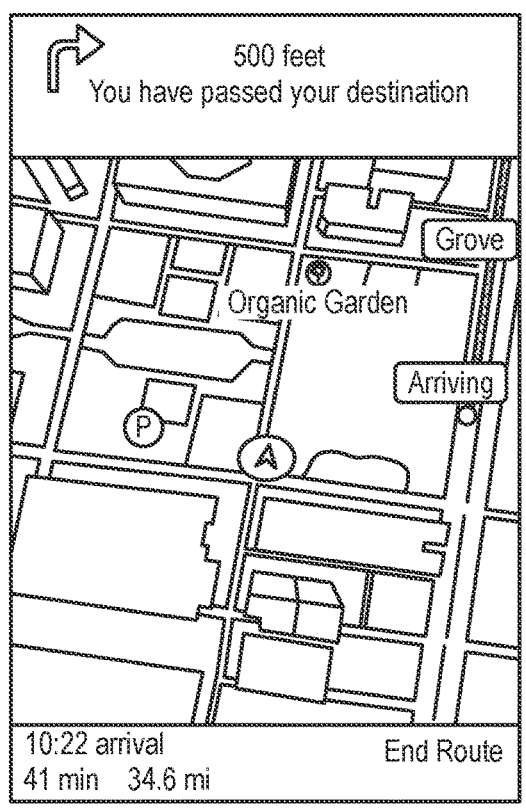
Figure 16:
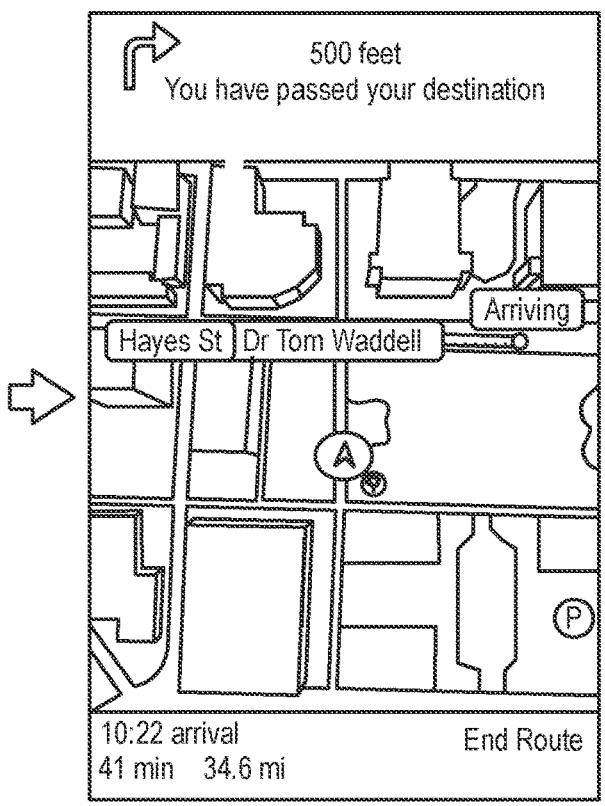

The VC engine 120 also has the virtual camera operate in a framing mode when the puck passes an arrival point for a route, or is trying to get on a departure point for the route. FIG. 16 illustrates an example of framing a puck 1600 and an arrival point 1605 after the puck passes the arrival point. This example is illustrated in four scenes 1602-1608. The first scene 1602 shows the puck from a vantage point of a virtual camera that operates in a 3D perspective view. In this scene, the puck has not yet reached the arrival point.

The second, third, and fourth scenes 1604-1608 show the puck after it has passed the arrival point. Each of these scenes 1604, 1606 and 1608 shows the puck after one right turn as it circles back to the arrival point. Each of these scenes 1604-1608 are displayed from a top-down 2D view. In other embodiments, these scenes would be displayed as a pitch perspective view. Also, in the second, third, and fourth scenes 1604-1608, the virtual camera frames the puck and the arrival point and positions this frame within the field of focus on the display screen.

In this framing, the puck is maintained at the center of the display area, or near this center, as the map moves about the puck. The puck however does rotate to provide an indication for its turning. This framing is highly useful when a user is having a hard time finding the arrival point, as it keeps the puck and the arrival point in the presentation's field of focus while the puck moves around to reach this point. In addition to framing the puck and the arrival point, the VC engine has the virtual camera also frame a nearby point-of-interest (a POI, like a building) when such a POI is available.

In some embodiments, the VC engine 120 receives a VC style (i.e., the set of VC properties) that specifies several framing parameters for directing the VC engine on how to have the virtual camera frame the puck when it passes the arrival point. Examples of such framing parameters include the 2D top-down view of the virtual camera, the placement of the puck at the center of the screen, and/or the specification of the arrival point, and a nearby POI if any, as locations to frame along with the puck. In some embodiments, the received VC style does not specify some of these parameters, and/or specifies other framing parameters.

Figure 17:
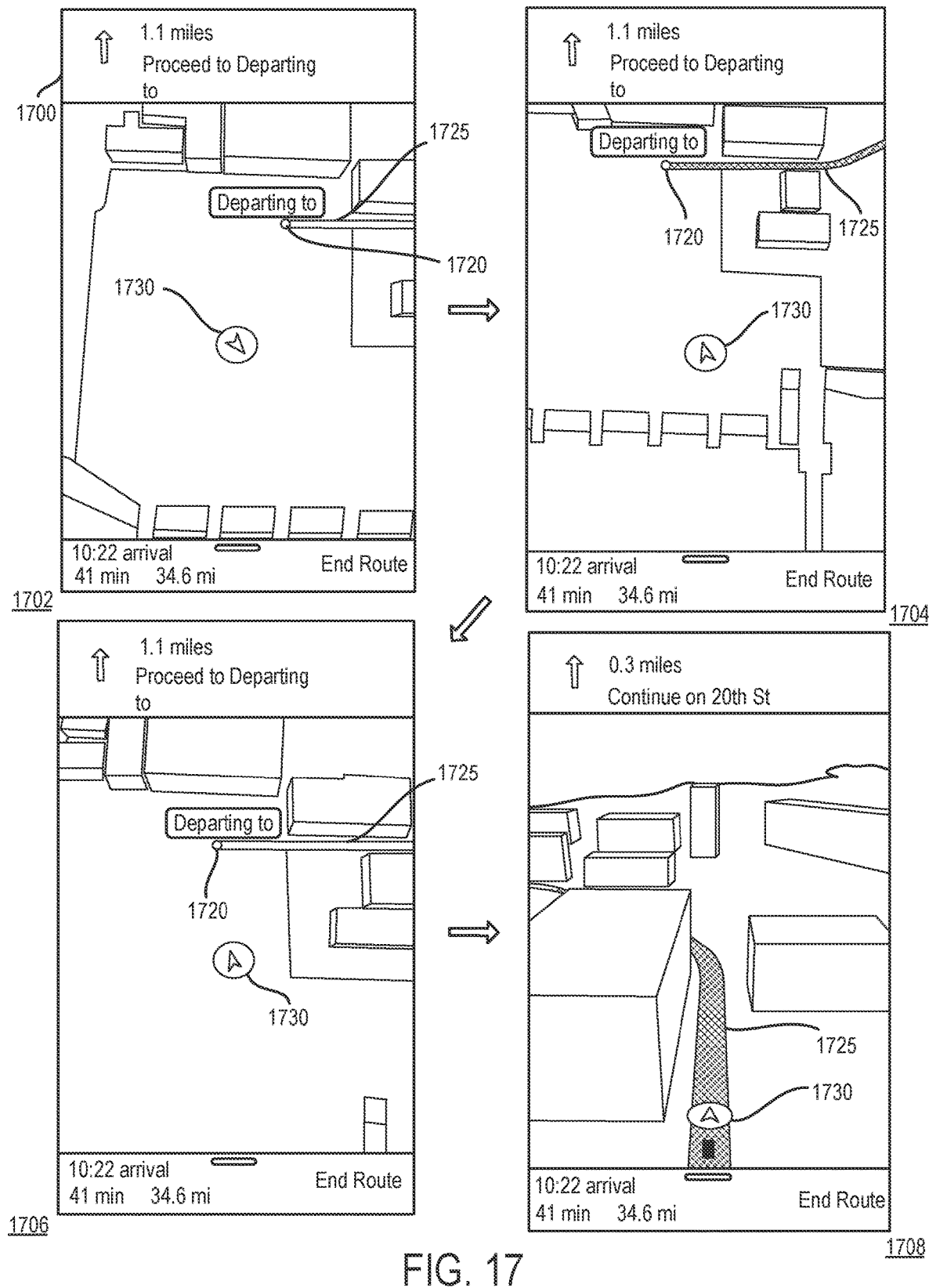
FIG. 17 illustrates an example of framing a puck and a departure point before a puck gets on a displayed route to commence navigating to a destination.

FIG. 17 illustrates an example of framing a puck and a departure point before a puck 1730 gets on a displayed route 1725 to commence navigating to a destination. This example is illustrated in four scenes 1702-1708. The first, second, and third scenes 1702-1706 show the puck circling about a parking lot trying to reach a departure point 1720 to get on the route 1725. In some embodiments, the departure point 1720 corresponds to an actual location for the device to get on the route, while in other embodiments, this point is just a point on the displayed route as the exact location for exiting the parking lot is not known.

Each of the first, second and third scenes 1702, 1704 and 1706 shows the puck at a different location and orientation in the parking lot from a top-down 2D view. In some embodiments, these scenes would be 3D scenes captured by a perspective pitch position of the virtual camera. Also, in the first, second, and third scenes 1702-1706, the virtual camera frames the puck and the departure point and positions this frame at a desired region of interest on the display screen. In addition, the puck in this framing is maintained at the center of the display area, or near this center, as the map moves about the puck. The puck, however, does rotate to provide an indication for its turning. This framing is highly useful when a user is having a hard time finding the departure point, as it keeps puck and a representation of the route in the presentation's field of focus while the puck moves around to reach the route. The fourth scene 1708 shows the puck after it has gotten on the route 1725. As the puck is traveling on the route in an urban area, the virtual camera captures this scene from a 3D perspective view.

In addition to framing the puck 1730 and the departure point 1720, the first, second and third scenes 1702-1706 in some embodiments also include the location of a nearby point-of-interest (a POI, like a parking structure or building) when such a POI is available. Framing such additional POI along with the puck and the departure point further helps the user orient the puck 1730 towards the departure point 1720.

In some embodiments, the VC engine 120 receives a VC style (i.e., the set of VC properties) that specifies several framing parameters for directing the VC engine on how to have the virtual camera frame the puck before the puck has reached the departure point to start on the navigated route. Examples of such framing parameters include the 2D top-down view of the virtual camera, the placement of the puck at the center of the screen, and/or the specification of the departure point, and any relevant nearby POI, as locations to frame along with the puck. In some embodiments, the received VC style does not specify some of these parameters, and/or specifies other framing parameters.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 18:
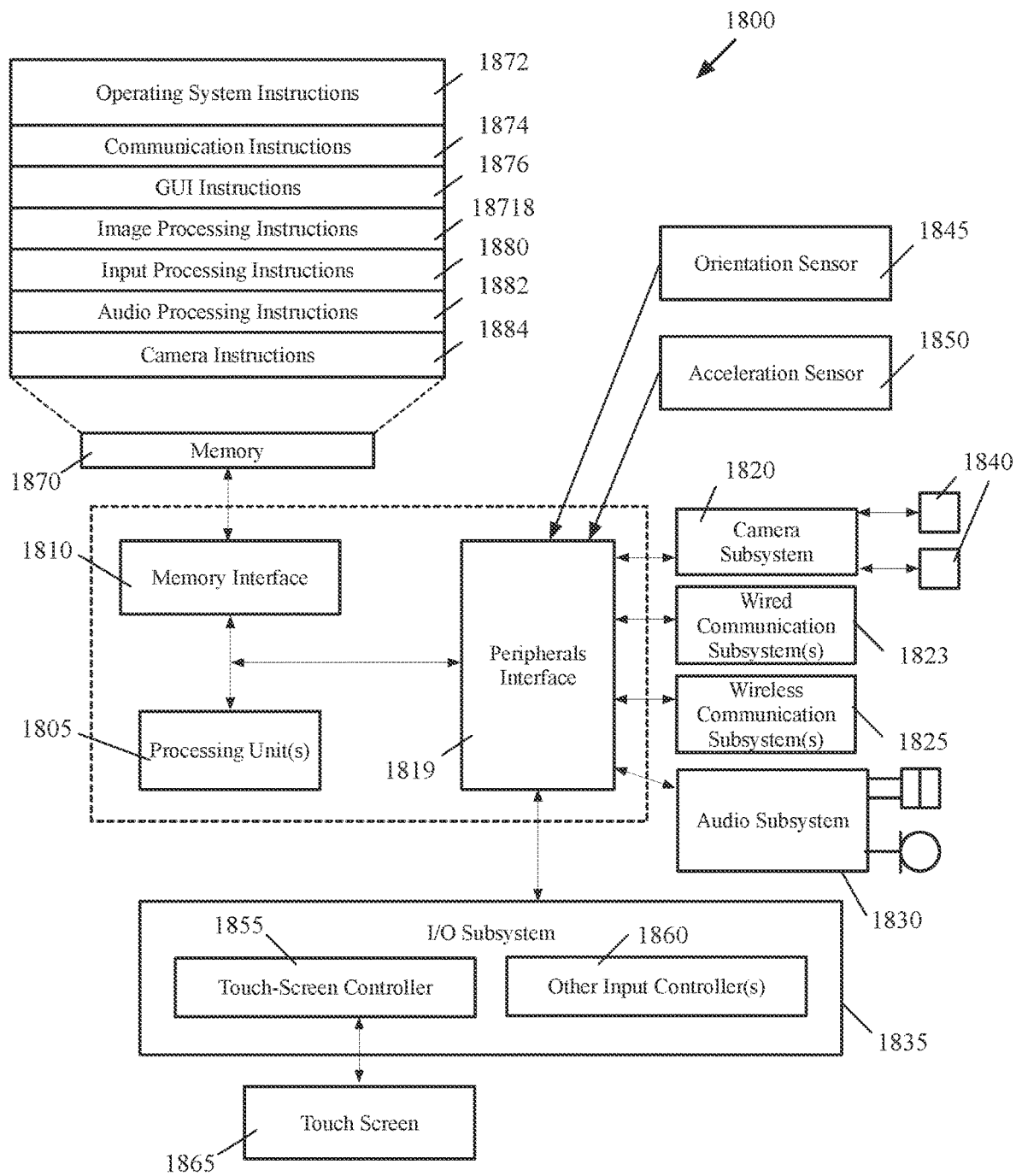
FIG. 18 is an example of an architecture of such a mobile computing device.

The applications of some embodiments operate on mobile devices, such as smart phones (e.g., iPhones®) and tablets (e.g., iPads®). FIG. 18 is an example of an architecture 1800 of such a mobile computing device. Examples of mobile computing devices include smartphones, tablets, laptops, etc. As shown, the mobile computing device 1800 includes one or more processing units 1805, a memory interface 1810 and a peripherals interface 1815.

The peripherals interface 1815 is coupled to various sensors and subsystems, including a camera subsystem 1820, a wireless communication subsystem(s) 1825, an audio subsystem 1830, an I/O subsystem 1835, etc. The peripherals interface 1815 enables communication between the processing units 1805 and various peripherals. For example, an orientation sensor 1845 (e.g., a gyroscope) and an acceleration sensor 1850 (e.g., an accelerometer) is coupled to the peripherals interface 1815 to facilitate orientation and acceleration functions.

The camera subsystem 1820 is coupled to one or more optical sensors 1840 (e.g., a charged coupled device (CCD) optical sensor, a complementary metal-oxide-semiconductor (CMOS) optical sensor, etc.). The camera subsystem 1820 coupled with the optical sensors 1840 facilitates camera functions, such as image and/or video data capturing. The wireless communication subsystem 1825 serves to facilitate communication functions. In some embodiments, the wireless communication subsystem 1825 includes radio frequency receivers and transmitters, and optical receivers and transmitters (not shown in FIG. 18). These receivers and transmitters of some embodiments are implemented to operate over one or more communication networks such as a GSM network, a Wi-Fi network, a Bluetooth network, etc. The audio subsystem 1830 is coupled to a speaker to output audio (e.g., to output voice navigation instructions). Additionally, the audio subsystem 1830 is coupled to a microphone to facilitate voice-enabled functions, such as voice recognition (e.g., for searching), digital recording, etc.

The I/O subsystem 1835 involves the transfer between input/output peripheral devices, such as a display, a touch screen, etc., and the data bus of the processing units 1805 through the peripherals interface 1815. The I/O subsystem 1835 includes a touch-screen controller 1855 and other input controllers 1860 to facilitate the transfer between input/output peripheral devices and the data bus of the processing units 1805. As shown, the touch-screen controller 1855 is coupled to a touch screen 1865. The touch-screen controller 1855 detects contact and movement on the touch screen 1865 using any of multiple touch sensitivity technologies. The other input controllers 1860 are coupled to other input/control devices, such as one or more buttons. Some embodiments include a near-touch sensitive screen and a corresponding controller that can detect near-touch interactions instead of or in addition to touch interactions.

The memory interface 1810 is coupled to memory 1870. In some embodiments, the memory 1870 includes volatile memory (e.g., high-speed random access memory), non-volatile memory (e.g., flash memory), a combination of volatile and non-volatile memory, and/or any other type of memory. As illustrated in FIG. 18, the memory 1870 stores an operating system (OS) 1872. The OS 1872 includes instructions for handling basic system services and for performing hardware dependent tasks.

The memory 1870 also includes communication instructions 1874 to facilitate communicating with one or more additional devices; graphical user interface instructions 1876 to facilitate graphic user interface processing; image processing instructions 1878 to facilitate image-related processing and functions; input processing instructions 1880 to facilitate input-related (e.g., touch input) processes and functions; audio processing instructions 1882 to facilitate audio-related processes and functions; and camera instructions 1884 to facilitate camera-related processes and functions. The instructions described above are merely exemplary and the memory 1870 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 18 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 18 may be split into two or more integrated circuits.

Figure 19:
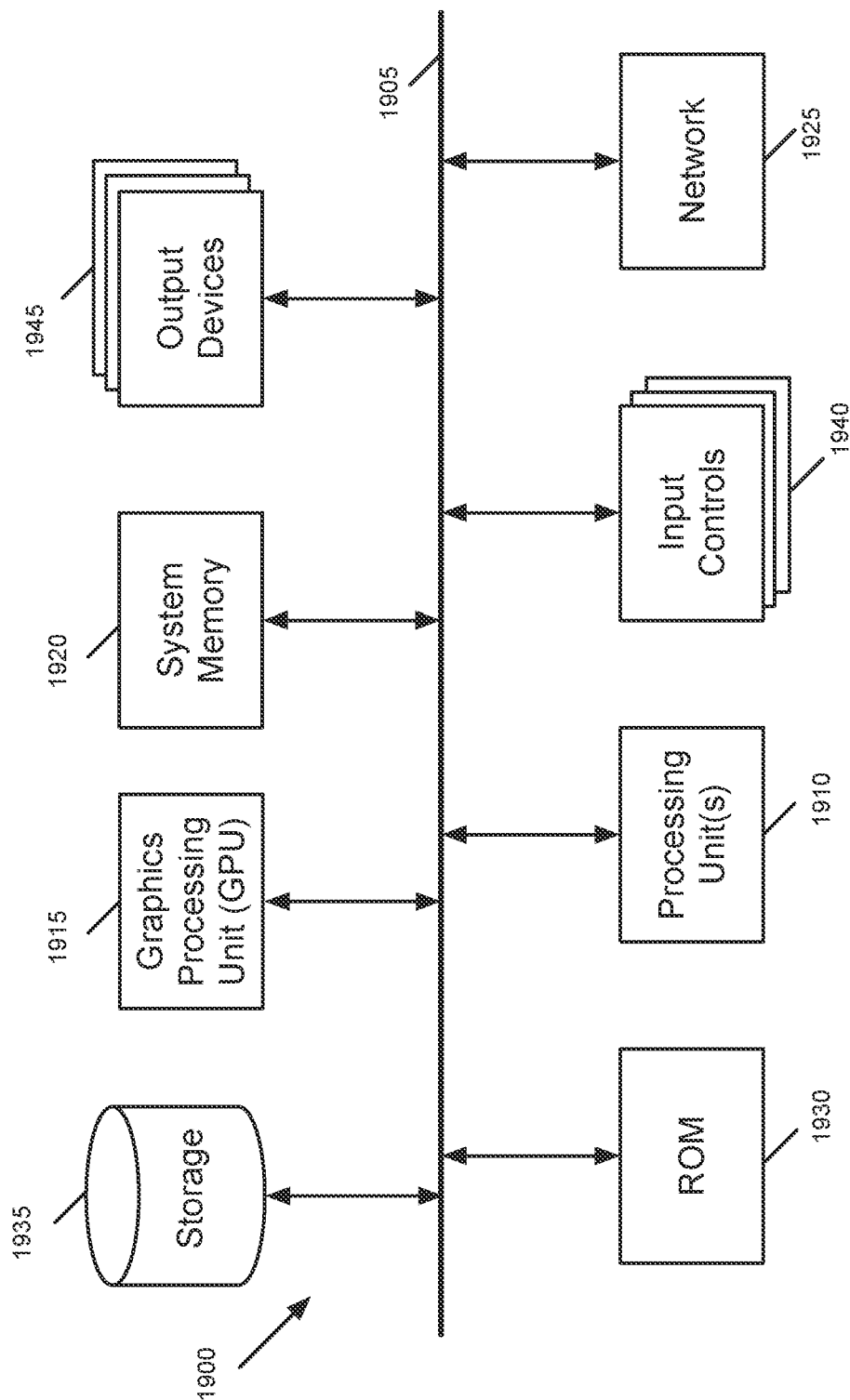
FIG. 19 conceptually illustrates another example of an electronic system with which some embodiments of the invention are implemented.

FIG. 19 conceptually illustrates another example of an electronic system 1900 with which some embodiments of the invention are implemented. The electronic system 1900 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1900 includes a bus 1905, processing unit(s) 1910, a graphics processing unit (GPU) 1915, a system memory 1920, a network 1925, a read-only memory 1930, a permanent storage device 1935, input devices 1940, and output devices 1945.

The bus 1905 collectively represents all system, peripheral, and chipset buses that communicatively connect the numerous internal devices of the electronic system 1900. For instance, the bus 1905 communicatively connects the processing unit(s) 1910 with the read-only memory 1930, the GPU 1915, the system memory 1920, and the permanent storage device 1935.

From these various memory units, the processing unit(s) 1910 retrieves instructions to execute and data to process in order to execute the processes of the invention. The processing unit(s) may be a single processor or a multi-core processor in different embodiments. Some instructions are passed to and executed by the GPU 1915. The GPU 1915 can offload various computations or complement the image processing provided by the processing unit(s) 1910.

The read-only-memory (ROM) 1930 stores static data and instructions that are needed by the processing unit(s) 1910 and other modules of the electronic system. The permanent storage device 1935, on the other hand, is a read-and-write memory device. This device is a non-volatile memory unit that stores instructions and data even when the electronic system 1900 is off. Some embodiments of the invention use a mass-storage device (such as a magnetic or optical disk and its corresponding disk drive, integrated flash memory) as the permanent storage device 1935.

Other embodiments use a removable storage device (such as a floppy disk, flash memory device, etc., and its corresponding drive) as the permanent storage device. Like the permanent storage device 1935, the system memory 1920 is a read-and-write memory device. However, unlike storage device 1935, the system memory 1920 is a volatile read-and-write memory, such a random access memory. The system memory 1920 stores some of the instructions and data that the processor needs at runtime. In some embodiments, the invention's processes are stored in the system memory 1920, the permanent storage device 1935, and/or the read-only memory 1930. For example, the various memory units include instructions for processing multimedia clips in accordance with some embodiments. From these various memory units, the processing unit(s) 1910 retrieves instructions to execute and data to process in order to execute the processes of some embodiments.

The bus 1905 also connects to the input and output devices 1940 and 1945. The input devices 1940 enable the user to communicate information and select commands to the electronic system. The input devices 1940 include alphanumeric keyboards and pointing devices (also called "cursor control devices"), cameras (e.g., webcams), microphones or similar devices for receiving voice commands, etc. The output devices 1945 display images generated by the electronic system or otherwise output data. The output devices 1945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 19, bus 1905 also couples electronic system 1900 to a network 1925 through a network adapter (not shown). In this manner, the computer can be a part of a network of computers (such as a local area network ("LAN"), a wide area network ("WAN"), or an Intranet), or a network of networks, such as the Internet. Any or all components of electronic system 1900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

Figure 20:
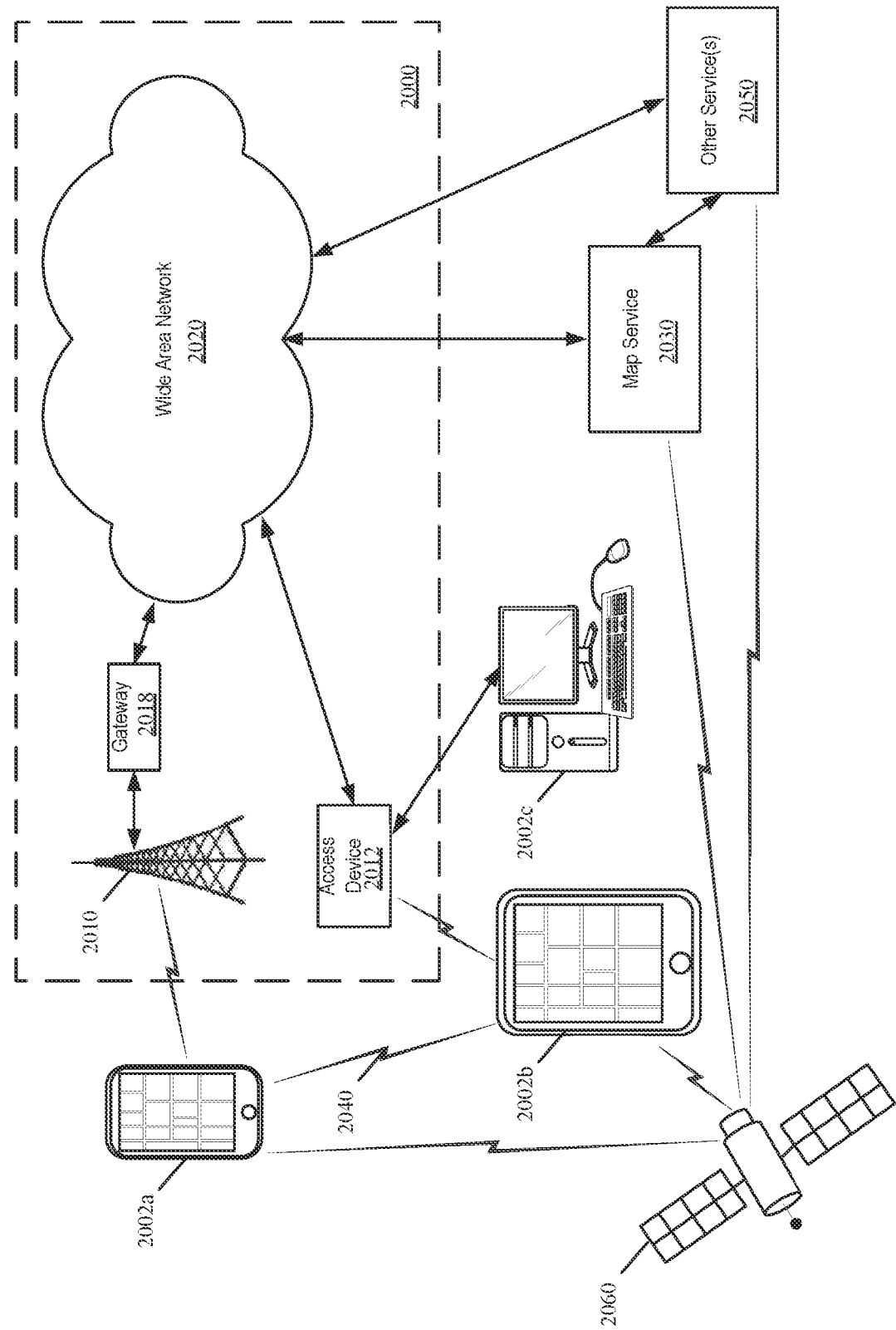
FIG. 20 illustrates one possible embodiment of an operating environment for a map service and client devices.

Various embodiments may operate within a map service operating environment. FIG. 20 illustrates one possible embodiment of an operating environment 2000 for a map service (also referred to as a mapping service) 2030 and client devices 2002a-2002c. In some embodiments, devices 2002*a*, 2002*b*, and 2002*c* communicate over one or more wired or wireless networks 2010. For example, wireless network 2010, such as a cellular network, can communicate with a wide area network (WAN) 2020, such as the Internet, by use of gateway 2014. A gateway 2014 in some embodiments provides a packet oriented mobile data service, such as General Packet Radio Service (GPRS), or other mobile data service allowing wireless networks to transmit data to other networks, such as wide area network 2020. Likewise, access device 2012 (e.g., IEEE 802.11g wireless access device) provides communication access to WAN 2020.

The client devices 2002*a* and 2002*b* can be any portable electronic or computing device capable of communicating with a map service (e.g., smart phone, tablet, laptop computer, etc.). Device 2002*c* can be any non-portable electronic or computing device capable of communicating with a map service (e.g., desktop computer, etc.). These devices may be multifunction devices capable of various functions (e.g., placing phone calls, sending electronic messages, producing documents, etc.). Though the devices 2002*a*-2002*c* are not shown as each accessing the map service 2030 via either the wireless network 2010 and gateway 2014 or the access device 2012, one of ordinary skill in the art will recognize that the client devices of some embodiments may access the map service via multiple different wired and/or wireless protocols.

Devices 2002*a*-2002*c* can also establish communications by other means. For example, these devices may communicate with other wireless devices (e.g., other devices 2002*b*, cell phones, etc.) over the wireless network 2010 or through access device 2012. Likewise the devices 2002*a*-2002*c* can establish peer-to-peer communications 2040 (e.g., a personal area network) by use of one or more communication subsystems, such as Bluetooth® communication or similar peer-to-peer protocols.

Devices 2002*a*-2002*c* may also receive Global Positioning Satellite (GPS) signals from GPS satellites 2060. In addition, in some embodiments the map service 2030 and other services 2050 may also receive GPS signals from GPS satellites 2060.

A map service 2030 may provide map services for one or more client devices 2002*a*-2002*c* in communication with the map service 2030 through various communication methods and protocols. A map service 2030 in some embodiments provides map information (e.g., map tiles used by the client devices to generate a two-dimensional or three-dimensional map presentation) and other map-related data, such as two-dimensional map image data (e.g., aerial view of roads utilizing satellite imagery), three-dimensional map image data (e.g., traversable map with three-dimensional features, such as buildings), route and direction calculations (e.g., driving route data, ferry route calculations, directions between two points for a pedestrian, etc.), real-time navigation data (e.g., turn-by-turn visual navigation data in two or three dimensions), traffic data, location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. The client devices 2002*a*-2002*c* may utilize these map services to obtain the various map service data, then implement various techniques to process the data and provide the processed data to various entities (e.g., internal software or hardware modules, display screens of the client devices, external display screens, or other external systems or devices.

The map service 2030 of some embodiments provides map services by generating and distributing the various types of map service data listed above, including map information used by the client device to generate and display a map presentation. In some embodiments, the map information includes one or more map tiles. The map tiles may include raster image data (e.g., bmp, gif, jpg/jpeg/, png, tiff, etc. data) for display as a map presentation. In some embodiments, the map tiles provide vector-based map data, with the map presentation data encoded using vector graphics (e.g., svg or drw data). The map tiles may also include various other information pertaining to the map, such as metadata. Some embodiments also encode style data (e.g., used to generate textures) into the map tiles. The client device processes (e.g., renders) the vector and/or raster image data to generate a map presentation for display as a two-dimensional or three-dimensional map presentation. To transmit the map tiles to a client device 2002*a*-2002*c*, the map service 2030 of some embodiments, performs various optimization techniques to analyze a map tile before encoding the tile.

In some embodiments, the map tiles are generated by the map service 2030 for different possible display resolutions at the client devices 2002*a*-2002*c*. In some embodiments, the higher zoom levels may include more detail (e.g., more street level information, etc.). On the other hand, map tiles for lower zoom levels may omit certain data (e.g., the street level details would not be used when displaying the entire earth).

To generate the map information (e.g., map tiles), the map service 2030 may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

In some embodiments, the map service 2030 responds to requests from the client devices 2002*a*-2002*c* for map information. The client devices may request specific portions of a map, or specific map tiles (e.g., specific tiles at specific zoom levels). In some embodiments, the client devices may provide the map service with starting locations (or current locations) and destination locations for a route calculations, and request turn-by-turn navigation data. A client device may also request map service rendering information, such as map textures or style sheets. Requests for other geographic data may include, but are not limited to, current location, wireless network coverage, weather, traffic information, or nearby points-of-interest.

The client devices 2002*a*-2002*c* that obtain map service data from the map service 2030 and render the data to display the map information in two-dimensional and/or three-dimensional views. Some embodiments display a rendered map and allow a user, system, or device to provide input to manipulate a virtual camera for the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe)

manipulate the virtual camera. Other embodiments allow manipulation of the device's physical location to manipulate a virtual camera. Other input devices to the client device may be used including, e.g., auditory input (e.g., spoken words), a physical keyboard, mouse, and/or a joystick. Some embodiments provide various visual feedback to virtual camera manipulations, such as displaying an animation of possible virtual camera manipulations when transitioning from two-dimensional map views to three-dimensional map views.

In some embodiments, a client device 2002a-2002c implements a navigation system (e.g., turn-by-turn navigation), which may be part of an integrated mapping and navigation application. A navigation system provides directions or route information, which may be displayed to a user. As mentioned above, a client device may receive both map image data and route data from the map service 2030. In some embodiments, the navigation feature of the client device provides real-time route and direction information based upon location information and route information received from a map service and/or other location system, such as a Global Positioning Satellite (GPS) system. A client device may display map image data that reflects the current location of the client device and update the map image data in real-time. The navigation features may provide auditory or visual directions to follow a certain route, and some embodiments display map data from the perspective of a virtual camera biased toward the route destination during turn-by-turn navigation.

The client devices 2002a-2002c of some embodiments implement various techniques to utilize the received map service data (e.g., optimized rendering techniques). In some embodiments, a client device locally stores some of the information used to render map data. For instance, client devices may store style sheets with rendering directions for image data containing style identifiers, common image textures (in order to decrease the amount of map image data transferred from the map service), etc. The client devices of some embodiments may implement various techniques to render two-dimensional and three-dimensional map image data, including, e.g., generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data.

In various embodiments, map service 2030 and/or other service(s) 2050 are configured to process search requests from any of the client devices. Search requests may include but are not limited to queries for businesses, addresses, residential locations, points of interest, or some combination thereof. Map service 2030 and/or other service(s) 2050 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 2030 and/or other service(s) 2050 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 2030 and/or other service(s) 2050, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 2030 and/or other service(s) 2050 provide one or more feedback mechanisms to receive feedback from client devices 2002a-2002c. For instance, client devices may provide feedback on search results to map service 2030 and/or other service(s) 2050 (e.g., feedback specifying ratings, reviews, temporary or permanent business closures, errors etc.); this feedback may be used to update information about points of interest in order to provide more accurate or more up-to-date search results in the future. In some embodiments, map service 2030 and/or other service(s) 2050 may provide testing information to the client device (e.g., an A/B test) to determine which search results are best. For instance, at random intervals, the client device may receive and present two search results to a user and allow the user to indicate the best result. The client device may report the test results to map service 2030 and/or other service(s) 2050 to improve future search results based on the chosen testing technique, such as an A/B test technique in which a baseline control sample is compared to a variety of single-variable test samples in order to improve results.

What is claimed is:

1. A non-transitory machine readable medium storing a program for execution by at least one processing unit of a device, the program comprising sets of instructions for:
   displaying at least a portion of a navigated route on a display of a device;
   identifying a maneuver along the navigated route;
   determining that the device is within a threshold distance of the maneuver, wherein the maneuver is not represented in the displayed portion of the navigated route when the device is determined to be within the threshold distance of the maneuver; and responsive to determining that the device is within the threshold distance of the maneuver, generating a first navigation presentation having a first map view that frames:
- (a) a first graphical object representing the current location of the device, and
- (b) a second graphical object representing the maneuver along the navigated route.

2. The non-transitory machine readable medium of claim 1, wherein the maneuver is framed at a top of the first navigation presentation, and wherein the first map view also frames a plurality of locations ahead of the first graphical object on the navigated route.

3. The non-transitory machine readable medium of claim 1, wherein the maneuver is not included in the displayed portion of the navigated route when the device is determined to be within the threshold distance of the maneuver, and wherein the maneuver is included, responsive to determining that the device is within the threshold distance of the maneuver, in the first map view.

4. The non-transitory machine readable medium of claim 1, wherein the maneuver is included with a plurality of ramps that connect to different streets or different directions of travel along a same street, wherein the first navigation presentation displays the plurality of ramps, and wherein the maneuver is highlighted on the first navigation presentation relative to the plurality of ramps.

5. The non-transitory machine readable medium of claim 1, wherein a zoom level for the first map view is selected such that the first graphical object representing the current location of the device, and the second graphical object representing the maneuver are concurrently displayed at all times.

6. The non-transitory machine readable medium of claim 1, wherein the program further comprises a set of instructions for:
determining that a first point of interest is not within a threshold distance of the current location of the device; and
responsive to determining that the first point of interest is not within the threshold distance of the current location of the device: refraining from including the first point of interest in the map view that includes the first graphical object representing the current location of the device and the second graphical object representing the maneuver along the navigated route.

7. The non-transitory machine readable medium of claim 1, wherein the first navigation presentation is a three-dimensional (3D) navigation presentation, and wherein the program further comprises a set of instructions for:
determining that a distance to the maneuver along the navigated route is within a threshold distance of the current location of the device; and
responsive to determining that the distance to the maneuver is within the threshold distance of the current location of the device: reducing a height of a virtual camera used to provide the 3D navigation presentation to show a closer perspective 3D presentation.

8. The non-transitory machine readable medium of claim 7, wherein the first graphical object rotates independently from the second graphical object to maintain the maneuver at a top of the first navigation presentation.

9. The non-transitory machine readable medium of claim 1, wherein the maneuver uses a freeway or highway ramp.

10. A device comprising:
one or more processors; and
a non-transitory machine readable medium storing a program for execution by the one or more processors, the program comprising sets of instructions for:
displaying at least a portion of a navigated route on a display of the device;
identifying a maneuver along the navigated route;
determining that the device is within a threshold distance of the maneuver, wherein the maneuver is not represented in the displayed portion of the navigated route when the device is determined to be within the threshold distance of the maneuver; and
responsive to determining that the device is within the threshold distance of the maneuver, generating a first navigation presentation having a first map view that frames:
- (a) a first graphical object representing the current location of the device, and
- (b) a second graphical object representing the maneuver along the navigated route.

11. The device of claim 10, wherein the maneuver is framed at a top of the first navigation presentation.

12. The device of claim 10, wherein the maneuver is a freeway or highway entrance that is framed at a top of the first navigation presentation.

13. The device of claim 10, wherein the maneuver is included with a plurality of ramps that connect to different streets or different directions of travel along a same street, wherein the first navigation presentation displays the plurality of ramps, and wherein the maneuver is highlighted on the first navigation presentation relative to the plurality of ramps.

14. The device of claim 10, wherein the first map view also frames a plurality of locations ahead of the first graphical object on the navigated route.

15. The device of claim 10, wherein the program further comprises a set of instructions for:
determining that a first point of interest is not within a threshold distance of the current location of the device; and
responsive to determining that the first point of interest is not within the threshold distance of the current location of the device: refraining from including the first point of interest in the map view that includes the first graphical object representing the current location of the device and the second graphical object representing the maneuver along the navigated route.

16. The device of claim 10, wherein the first navigation presentation is a three-dimensional (3D) navigation presentation, and wherein the program further comprises a set of instructions for:
determining that a distance to the maneuver along the navigated route is within a threshold distance of the current location of the device; and
responsive to determining that the distance to the maneuver is within the threshold distance of the current location of the device: reducing a height of a virtual camera used to provide the 3D navigation presentation to show a closer perspective 3D presentation.

17. The device of claim 16, wherein the first graphical object rotates independently from the second graphical object to maintain the maneuver at a top of the first navigation presentation.

18. A method comprising:
displaying at least a portion of a navigated route on a display of a device;
identifying a maneuver along the navigated route;
determining that the device is within a threshold distance of the maneuver, wherein the maneuver is not represented in the displayed portion of the navigated route when the device is determined to be within the threshold distance of the maneuver; and
responsive to determining that the device is within the threshold distance of the maneuver, generating a first navigation presentation having a first map view that frames:
  (a) a first graphical object representing the current location of the device, and
  (b) a second graphical object representing the maneuver along the navigated route.

19. The method of claim 18, wherein the maneuver is framed at a top of the first navigation presentation.

20. The method of claim 18, wherein the maneuver is a freeway or highway entrance that is framed at a top of the first navigation presentation.

21. The method of claim 18, wherein the maneuver is included with a plurality of ramps that connect to different streets or different directions of travel along a same street, wherein the first navigation presentation displays the plurality of ramps, and wherein the maneuver is highlighted on the first navigation presentation relative to the plurality of ramps.

\* \* \* \* \*